US010000666B2

(12) United States Patent
Hawkins et al.

(10) Patent No.: US 10,000,666 B2
(45) Date of Patent: Jun. 19, 2018

(54) INSULATIVE PRODUCTS HAVING BIO-BASED BINDERS

(71) Applicant: Owens Corning Intellectual Capital, LLC, Toledo, OH (US)

(72) Inventors: Christopher M. Hawkins, Alexandria, OH (US); Jesus Manuel Hernandez-Torres, Pataskala, OH (US); Liang Chen, New Albany, OH (US); Edward Alan Martine, Newark, OH (US); Jacob Chacko, Pickerington, OH (US)

(73) Assignee: Owens Corning Intellectual Capital, LLC, Toledo, OH (US)

(*) Notice: Subject to any disclaimer, the term of this patent is extended or adjusted under 35 U.S.C. 154(b) by 0 days. days.

(21) Appl. No.: 14/302,604

(22) Filed: Jun. 12, 2014

(65) Prior Publication Data

US 2014/0364029 A1     Dec. 11, 2014

Related U.S. Application Data

(60) Division of application No. 13/037,725, filed on Mar. 1, 2011, now abandoned, which is a
(Continued)

(51) Int. Cl.
*C09D 189/00*     (2006.01)
*C03C 25/14*     (2018.01)
(Continued)

(52) U.S. Cl.
CPC ........ *C09D 189/00* (2013.01); *C03C 25/1095* (2013.01); *C03C 25/146* (2013.01);
(Continued)

(58) Field of Classification Search
CPC .. C09D 191/00; C09D 133/02; C09D 189/00; C03C 25/24–25/40; C03C 25/1095;
(Continued)

(56) References Cited

U.S. PATENT DOCUMENTS

| 2,407,548 A | 9/1946 | Goldman |
| 3,416,288 A | 12/1968 | Coons |

(Continued)

FOREIGN PATENT DOCUMENTS

| CN | 101203555 | 6/2008 |
| CN | 101218186 | 7/2008 |

(Continued)

OTHER PUBLICATIONS

Chirife, J. A Simple Model for Predicting the Viscosity of Sugar and Oligosaccharide Solutions, Journal of Food Engineering 33 1997 221-226.*

(Continued)

*Primary Examiner* — Frank J Vineis
(74) *Attorney, Agent, or Firm* — Calfee, Halter & Griswold LLP

(57) ABSTRACT

Fibrous insulation products have an aqueous binder composition that includes a carbohydrate and a crosslinking agent. In exemplary embodiments, the carbohydrate-based binder composition may also include a catalyst, a coupling agent, a process aid, a crosslinking density enhancer, an extender, a moisture resistant agent, a deducting oil, a colorant, a corrosion inhibitor, a surfactant, a pH adjuster, and combinations thereof. The carbohydrate may be natural in origin and derived from renewable resources. Additionally, the carbohydrate polymer may have a dextrose equivalent (DE) number from 2 to 20. In at least one exemplary embodiment, the carbohydrate is a water-soluble polysaccharide such as dextrin or maltodextrin and the crosslinking (Continued)

agent is citric acid. Advantageously, the carbohydrates have a low viscosity and cure at moderate temperatures. The environmentally friendly, formaldehyde-free binder may be used in the formation of insulation materials and non-woven chopped strand mats. A method of making fibrous insulation products is also provided.

10 Claims, 3 Drawing Sheets

Related U.S. Application Data continuation-in-part of application No. 12/900,540, filed on Oct. 8, 2010, now Pat. No. 8,864,893.

(60) Provisional application No. 61/250,187, filed on Oct. 9, 2009.

(51) Int. Cl.
    *C03C 25/24* (2018.01)
    *C03C 25/10* (2018.01)
    *C09J 103/02* (2006.01)
    *C09J 103/04* (2006.01)
    *C09J 105/06* (2006.01)
    *C03C 25/32* (2018.01)
    *C09D 133/02* (2006.01)
    *C09D 191/00* (2006.01)
    *C09D 105/00* (2006.01)

(52) U.S. Cl.
    CPC .............. *C03C 25/24* (2013.01); *C03C 25/32* (2013.01); *C03C 25/321* (2013.01); *C09D 133/02* (2013.01); *C09D 191/00* (2013.01); *C09J 103/02* (2013.01); *C09J 103/04* (2013.01); *C09J 105/06* (2013.01); *C08L 2312/00* (2013.01); *C08L 2666/44* (2013.01); *C09D 105/00* (2013.01); *D06N 2201/082* (2013.01); *D06N 2209/065* (2013.01); *Y10T 428/1314* (2015.01); *Y10T 428/249924* (2015.04); *Y10T 442/2959* (2015.04); *Y10T 442/2992* (2015.04); *Y10T 442/60* (2015.04)

(58) Field of Classification Search
    CPC ................... Y10T 442/2959–442/2967; Y10T 428/249924; Y10T 442/2926; Y10T 442/2992; Y10T 442/60; Y10T 428/1314; C08L 2666/44; C08L 2312/00–2312/08
    USPC ....... 442/59, 136, 149, 172, 180; 106/124.1, 106/125.1–134.2, 135.1, 146.1, 106/217.7–217.9; 427/384; 524/17–26, 524/311, 377, 388, 414
    See application file for complete search history.

(56) References Cited

U.S. PATENT DOCUMENTS

| | | |
|---|---|---|
| 3,669,638 A | 6/1972 | Wong et al. |
| 3,705,073 A | 12/1972 | Marzocchi et al. |
| 3,759,854 A | 9/1973 | Chang et al. |
| 3,842,977 A | 10/1974 | Hollander |
| 3,944,690 A | 3/1976 | Distler et al. |
| 4,052,257 A | 10/1977 | Hill et al. |
| 4,054,713 A | 10/1977 | Sakaguchi et al. |
| 4,324,833 A | 4/1982 | Yau |
| 5,055,428 A | 10/1991 | Porter |
| 5,077,361 A | 12/1991 | Hughes et al. |
| 5,116,980 A | 5/1992 | Floyd et al. |
| 5,134,160 A | 7/1992 | Whitekettle et al. |
| 5,208,075 A | 5/1993 | Kroner et al. |
| 5,284,700 A | 2/1994 | Strauss et al. |
| 5,312,064 A | 6/1994 | Vaidya et al. |
| 5,318,990 A | 6/1994 | Strauss |
| 5,340,868 A | 8/1994 | Straus et al. |
| 5,346,947 A | 9/1994 | Guerro et al. |
| 5,371,140 A | 12/1994 | Parks |
| 5,393,335 A | 2/1995 | Puckett et al. |
| 5,430,070 A | 7/1995 | Kono |
| 5,446,078 A | 8/1995 | Vaidya et al. |
| 5,480,963 A | 1/1996 | Jiang et al. |
| 5,523,264 A | 6/1996 | Mattison |
| 5,565,254 A | 10/1996 | Norvell |
| 5,582,682 A | 12/1996 | Ferretti |
| 5,635,123 A | 6/1997 | Riebel et al. |
| 5,661,213 A | 8/1997 | Arkens et al. |
| 5,714,264 A | 2/1998 | Sacharski et al. |
| 5,888,292 A | 3/1999 | Tremblay |
| 5,895,804 A | 4/1999 | Lee et al. |
| 5,932,499 A | 8/1999 | Xu et al. |
| 5,983,598 A | 11/1999 | Quinones |
| 6,182,422 B1 | 2/2001 | Andersen et al. |
| 6,221,973 B1 | 4/2001 | Arkens et al. |
| 6,274,661 B1 | 8/2001 | Chen et al. |
| 6,331,350 B1 | 12/2001 | Taylor et al. |
| 6,369,104 B1 | 4/2002 | Kleina et al. |
| 6,399,694 B1 | 6/2002 | McGrath et al. |
| 6,439,383 B1 | 8/2002 | Janousek |
| 6,447,596 B1 | 9/2002 | Tremblay et al. |
| 6,527,014 B1 | 3/2003 | Aubourg |
| 6,613,152 B1 | 9/2003 | Maas et al. |
| 6,699,945 B1 | 3/2004 | Chen et al. |
| 6,878,455 B2 | 4/2005 | Kunzel et al. |
| 6,884,849 B2 | 4/2005 | Chen et al. |
| 6,890,666 B2 | 5/2005 | Kunzel et al. |
| 6,933,349 B2 | 8/2005 | Chen et al. |
| 7,026,390 B2 | 4/2006 | O'Brien Bernini et al. |
| 7,141,626 B2 | 11/2006 | Rodrigues et al. |
| 7,258,802 B2 | 8/2007 | Miks |
| 7,754,020 B2 | 7/2010 | Cline et al. |
| 7,772,347 B2 | 8/2010 | Swift et al. |
| 7,780,858 B2 | 8/2010 | Miks |
| 7,803,879 B2 | 9/2010 | Srinivasan et al. |
| 7,807,771 B2 | 10/2010 | Swift et al. |
| 7,829,197 B2 | 11/2010 | Chen et al. |
| 7,829,611 B2 | 11/2010 | Kelly |
| 7,842,382 B2 | 11/2010 | Helbing |
| 7,854,980 B2 | 12/2010 | Jackson et al. |
| 7,893,154 B2 | 2/2011 | Van Herwijnen et al. |
| 7,935,274 B2 | 3/2011 | Schlosser |
| 8,053,049 B2 | 11/2011 | Ruid et al. |
| 8,197,587 B2 | 6/2012 | Jaffrennou et al. |
| 8,569,315 B2 | 10/2013 | Sianawati |
| 8,864,893 B2 | 10/2014 | Hawkins et al. |
| 8,980,807 B2 | 3/2015 | Hora et al. |
| 2001/0033926 A1 | 10/2001 | Matthews et al. |
| 2002/0182965 A1 | 12/2002 | Snyder |
| 2002/0188055 A1 | 12/2002 | Chen et al. |
| 2003/0008978 A1 | 1/2003 | Chen et al. |
| 2003/0022580 A1 | 1/2003 | Bogrett et al. |
| 2003/0181602 A1 | 9/2003 | Ansmann et al. |
| 2004/0001963 A1 | 1/2004 | Watanabe et al. |
| 2004/0043686 A1 | 3/2004 | Batdorf |
| 2004/0103604 A1 | 6/2004 | Kunzel et al. |
| 2004/0122166 A1 | 6/2004 | O'Brien et al. |
| 2004/0254285 A1 | 12/2004 | Rodrigues et al. |
| 2005/0070186 A1 | 3/2005 | Shoemake et al. |
| 2005/0084675 A1 | 4/2005 | Wang |
| 2005/0170721 A1 | 8/2005 | Toas et al. |
| 2005/0192390 A1 | 9/2005 | Dobrowolski et al. |
| 2005/0215153 A1 | 9/2005 | Cossement et al. |
| 2005/0260368 A1 | 11/2005 | Ruid et al. |
| 2005/0284065 A1 | 12/2005 | Shaffer |
| 2006/0057365 A1 | 3/2006 | Swoboda et al. |
| 2006/0111480 A1 | 5/2006 | Hansen et al. |
| 2006/0178064 A1 | 8/2006 | Balthes et al. |
| 2006/0252855 A1 | 11/2006 | Pisanova et al. |
| 2006/0252955 A1 | 11/2006 | Pisanova et al. |
| 2007/0010651 A1 | 1/2007 | Finch et al. |
| 2007/0014995 A1 | 1/2007 | Chacko et al. |

(56) References Cited

U.S. PATENT DOCUMENTS

| | | |
|---|---|---|
| 2007/0027283 A1 | 2/2007 | Swift et al. |
| 2007/0036975 A1 | 2/2007 | Miele et al. |
| 2007/0054082 A1 | 3/2007 | Beyer et al. |
| 2007/0287019 A1 | 12/2007 | Chen et al. |
| 2008/0050602 A1* | 2/2008 | Spraul ............... C08L 79/02 428/479.6 |
| 2008/0051539 A1 | 2/2008 | Kelly |
| 2008/0108741 A1 | 5/2008 | VanHerwijnen et al. |
| 2008/0115460 A1 | 5/2008 | Ruid et al. |
| 2008/0156041 A1 | 7/2008 | Cooper |
| 2008/0190060 A1* | 8/2008 | Pinto .................. E04C 2/16 52/309.1 |
| 2008/0216450 A1 | 9/2008 | MacLeod et al. |
| 2008/0281285 A1 | 11/2008 | Noda et al. |
| 2009/0020448 A1 | 1/2009 | Emond |
| 2009/0068416 A1 | 3/2009 | Noda et al. |
| 2009/0080938 A1 | 3/2009 | Nagamine |
| 2009/0098387 A1* | 4/2009 | Brady ................ C09J 189/00 428/425.1 |
| 2009/0156080 A1 | 6/2009 | Finch et al. |
| 2009/0169867 A1 | 7/2009 | Kelly |
| 2009/0170978 A1 | 7/2009 | Kelly |
| 2009/0275699 A1 | 11/2009 | Zhang et al. |
| 2009/0324915 A1 | 12/2009 | Swift et al. |
| 2010/0048813 A1 | 2/2010 | Clauss et al. |
| 2010/0063166 A1 | 3/2010 | Behler |
| 2010/0147032 A1 | 6/2010 | Chacko et al. |
| 2010/0203790 A1 | 8/2010 | Moulton et al. |
| 2010/0222463 A1 | 9/2010 | Brady et al. |
| 2010/0242402 A1 | 9/2010 | Briner et al. |
| 2010/0282996 A1 | 11/2010 | Jaffrennou et al. |
| 2010/0300983 A1 | 12/2010 | Miks |
| 2010/0301256 A1 | 12/2010 | Hampson et al. |
| 2010/0305271 A1 | 12/2010 | Mentink et al. |
| 2010/0310867 A1 | 12/2010 | Van Herwijnen et al. |
| 2010/0320113 A1 | 12/2010 | Swift |
| 2011/0003522 A1 | 1/2011 | Chen et al. |
| 2011/0021101 A1 | 1/2011 | Hawkins et al. |
| 2011/0060095 A1 | 3/2011 | Tutin et al. |
| 2011/0086567 A1 | 4/2011 | Hawkins |
| 2011/0091710 A1 | 4/2011 | Mirth et al. |
| 2011/0100256 A1* | 5/2011 | Anderson et al. ......... 106/126.1 |
| 2011/0200814 A1 | 8/2011 | Hernandez-Torres |
| 2011/0210280 A1 | 9/2011 | Jaffrennou et al. |
| 2011/0223364 A1 | 9/2011 | Hawkins |
| 2011/0263757 A1* | 10/2011 | Rand .................. C08L 79/02 524/13 |
| 2012/0065417 A1 | 3/2012 | Hora et al. |
| 2012/0070645 A1 | 3/2012 | Jaffrennou et al. |
| 2012/0122758 A1 | 5/2012 | Andjelic et al. |
| 2012/0133073 A1 | 5/2012 | Pecorel et al. |
| 2012/0144868 A1 | 6/2012 | Mirth et al. |
| 2013/0023174 A1 | 1/2013 | Quinn et al. |
| 2013/0065803 A1 | 3/2013 | Hora et al. |
| 2013/0067861 A1 | 3/2013 | Turner |
| 2013/0211068 A1 | 8/2013 | Anderson et al. |
| 2014/0038485 A1 | 2/2014 | Anderson et al. |
| 2014/0051824 A1 | 2/2014 | Anderson et al. |
| 2014/0083328 A1 | 3/2014 | Lochel, Jr. et al. |
| 2015/0152244 A1 | 6/2015 | Hernandez-Torres |

FOREIGN PATENT DOCUMENTS

| | | |
|---|---|---|
| CN | 102695684 | 10/2010 |
| CN | 101939268 | 1/2011 |
| EP | 405921 | 1/1991 |
| EP | 1884526 | 2/2008 |
| EP | 2093266 | 8/2009 |
| FR | 2924719 | 6/2009 |
| GB | 865380 | 4/1961 |
| WO | 93/015140 | 8/1993 |
| WO | 96/039364 | 12/1996 |
| WO | 99/039039 | 8/1999 |
| WO | WO 9961538 A1 * | 12/1999 ......... C09D 189/005 |
| WO | 02/02476 | 1/2002 |
| WO | 02/096819 | 12/2002 |
| WO | 04/050978 | 6/2004 |
| WO | 06/120523 | 11/2006 |
| WO | 07/008412 | 1/2007 |
| WO | 08/011455 | 1/2008 |
| WO | 09/006532 | 1/2009 |
| WO | 09/019232 | 2/2009 |
| WO | 09/019235 | 2/2009 |
| WO | 09/034549 | 3/2009 |
| WO | 09/046521 | 4/2009 |
| WO | 09/080696 | 7/2009 |
| WO | 09/080938 | 7/2009 |
| WO | 09/095617 | 8/2009 |
| WO | 10/29266 | 3/2010 |
| WO | 2010/029266 | 3/2010 |
| WO | 10/120748 | 10/2010 |
| WO | 10/132641 | 11/2010 |
| WO | 10/135637 | 11/2010 |
| WO | 10/139899 | 12/2010 |
| WO | 11/002730 | 1/2011 |
| WO | 11/044490 | 4/2011 |
| WO | 12/118939 | 9/2012 |
| WO | 13/138723 | 10/2012 |

OTHER PUBLICATIONS

Office action from U.S. Appl. No. 12/825,375 dated Feb. 13, 2015.
Office action from U.S. Appl. No. 13/234,336 dated Jan. 14, 2015.
Office action from U.S. Appl. No. 13/187,650 dated Mar. 20, 2015.
Office action from European Application No. 15152030.1 dated Apr. 8, 2015.
Office action from U.S. Appl. No. 14/516,660 dated May 15, 2015.
International Search Report and Written Opinion from PCT/US10/030852 dated Aug. 25, 2010.
International Search Report and Written Opinion from PCT/US10/34670 dated Oct. 28, 2010.
International Search Report and Written Opinion from PCT/US10/040276 dated Oct. 1, 2010.
International Search Report and Written Opinion from PCT/US10/52028 dated Feb. 11, 2011.
International Search Report and Written Opinion from PCT/US12/27226 dated Jun. 25, 2012.
Office action from U.S. Appl. No. 12/758,910 dated Dec. 3, 2012.
Office action from U.S. Appl. No. 12/758,910 dated May 6, 2013.
Office action from U.S. Appl. No. 12/776,703 dated Oct. 5, 2012.
Office action from U.S. Appl. No. 12/776,703 dated Oct. 6, 2014.
Office action from U.S. Appl. No. 12/776,703 dated May 2, 2013.
Office action from U.S. Appl. No. 12/776,703 dated Aug. 15, 2013.
Office action from U.S. Appl. No. 12/776,703 dated Mar. 20, 2014.
Office action from U.S. Appl. No. 12/825,375 dated Oct. 9, 2012.
Office action from U.S. Appl. No. 12/825,375 dated May 23, 2013.
Office action from U.S. Appl. No. 12/825,375 dated Sep. 12, 2013.
Office action from U.S. Appl. No. 12/825,375 dated Apr. 24, 2014.
Office action from U.S. Appl. No. 12/900,540 dated Nov. 29, 2012.
Interview Summary from U.S. Appl. No. 12/900,540 dated Feb. 15, 2013.
Office action from U.S. Appl. No. 12/900,540 dated May 9, 2013.
Office action from U.S. Appl. No. 12/900,540 dated Jul. 5, 2013.
Correspondence to the EPO dated Mar. 1, 2012 from the Opponent/Respondent regarding Opposition to EP Application No. 03768889.2 (EP Patent No. 1578879).
Communication from the EPO dated Dec. 21, 2011 regarding Summons to Oral Proceedings regarding Opposition to EP Application No. 03768889.2 (EP Patent No. 1578879).
Correspondence to the EPO dated Nov. 2, 2012 from the Opponent/Respondent regarding Opposition to EP Application No. 03768889.2 (EP Patent No. 1578879).
Communication from the EPO dated Aug. 11, 2010 regarding Opposition to EP Application No. 03768889.2 (EP Patent No. 1578879).
Communication from the EPO dated Jul. 27, 2010 regarding Opposition to EP Application No. 03768889.2 (EP Patent No. 1578879).

(56) References Cited

OTHER PUBLICATIONS

Correspondence to the EPO dated Jul. 21, 2010 from the Patentee regarding Opposition to EP Application No. 03768889.2 (EP Patent No. 1578879).
Communication from the EPO dated Mar. 19, 2010 regarding Opposition to EP Application No. 03768889.2 (EP Patent No. 1578879).
Communication from the EPO dated Mar. 19, 2010 regarding minutes of Oral Proceedings for Opposition to EP Application No. 03768889.2 (EP Patent No. 1578879).
Correspondence to EPO dated Jan. 22, 2010 from Opponent/Respondent regarding Opposition to EP Application No. 03768889.2 (EP Patent No. 1578879).
Correspondence to the EPO dated Jan. 11, 2010 from Opponent/Respondent regarding Opposition to EP Application No. 03768889.2 (EP Patent No. 1578879).
Correspondence to the EPO dated Jan. 11, 2010 from the Patentee regarding Opposition to EP Application No. 03768889.2 (EP Patent No. 1578879).
Correspondence to the EPO dated Jan. 7, 2010 from the Patentee regarding Opposition to EP Application No. 03768889.2 (EP Patent No. 1578879).
Communication from the EPO dated Jul. 14, 2009 regarding Summons to attend Oral Proceedings for Opposition to EP Application No. 03768889.2 (EP Patent No. 1578879).
Correspondence to the EPO dated May 6, 2008 from the Patentee regarding Opposition to EP Application No. 03768889.2 (EP Patent No. 1578879).
Correspondence to the EPO dated Feb. 11, 2008 from the Patentee regarding Opposition to EP Application No. 03768889.2 (EP Patent No. 1578879).
Communication from the EPO dated Nov. 16, 2007 regarding a Notice of Opposition filing for Opposition to EP Application No. 03768889.2 (EP Patent No. 1578879).
Communication from the EPO dated Oct. 19, 2007 regarding a Notice of Opposition filing for Opposition to EP Application No. 03768889.2 (EP Patent No. 1578879).
Correspondence from Opponent/Respondent to the EPO dated Oct. 15, 2007 regarding Opposition to EP Application No. 03768889.2 (EP Patent No. 1578879).
Communication from the EPO dated Oct. 15, 2007 regarding Opposition to EP Application No. 03768889.2 (EP Patent No. 1578879).
Communication from the EPO dated May 20, 2010 regarding Opposition to EP Application No. 03768889.2 (EP Patent No. 1578879).
Declaration of Liang Chen signed May 9, 2013, 2 pgs.
Communication from the European Patent Office dated Aug. 16, 2005 regarding Serial No. 03768889.2.
Response to the European Patent Office dated Jul. 12, 2005 for Serial No. 03768889.2.
Communication from the European Patent Office dated Oct. 6, 2005 regarding Serial No. 03768889.2.
Response to the European Patent Office dated Feb. 3, 2006 for Serial No. 03768889.2.
Office action from U.S. Appl. No. 12/900,540 dated Feb. 12, 2014.
Office action from U.S. Appl. No. 12/900,540 dated Jul. 15, 2014.
Notice of Allowance from U.S. Appl. No. 12/900,540 dated Sep. 8, 2014.
Office action from U.S. Appl. No. 13/026,415 dated Feb. 1, 2013.
Office action from U.S. Appl. No. 13/026,415 dated Jul. 18, 2003.
Office action from U.S. Appl. No. 13/026,415 dated Feb. 10, 2014.
Office action from U.S. Appl. No. 13/026,415 dated Jul. 15, 2014.
Office action from U.S. Appl. No. 13/037,725 dated Oct. 15, 2012.
Interview Summary from U.S. Appl. No. 13/037,725 dated Feb. 15, 2013.
Office action from U.S. Appl. No. 13/037,725 dated May 6, 2013.
Office action from U.S. Appl. No. 13/037,725 dated Jul. 5, 2013.
Office action from U.S. Appl. No. 13/187,650 dated May 3, 2013.
Office action from U.S. Appl. No. 13/187,650 dated Nov. 26, 2013.
Office action from U.S. Appl. No. 13/187,650 dated Mar. 7, 2014.
Office action from U.S. Appl. No. 13/187,650 dated Nov. 6, 2014.
Office action from U.S. Appl. No. 13/234,336 dated Jul. 17, 2014.
Office action from Australian Application No. 2010303254 dated Oct. 10, 2014.
Office action from Chinese Application No. 201110401232.4 dated Jan. 30, 2014.
Office action from Chinese Application No. 201080051943.7 dated Mar. 3, 2014.
Office action from Chinese Application No. 201080051943.7 dated Oct. 17, 2014.
About.com "Monomeric Unit", accessed Jun. 18, 2012, http://composite.about.com/library/glossary/m/bldef-m3521.htm
Handbook of Adhesive Technology: Chapter 15—Carbohydrate Polymers as Adhesives, by Melissa Baumann and Anthony Conner, edited by A. Pizzi and K. Mittal, New York: Marcel Dekker, Inc. 1994.
American Chemical Society, Citric Acid, Jan. 30, 2014, 3 pgs.
Arch Chemicals, Building Products Biocide Selection Guide, Mar. 12, 2006.
Arch Biocide Selection Guide, www.archbiocides.com.
Archimica, "Vinylphosphonic acid and vinylphosphonic dimethyl ester", version 1, 2009.
Alvatroni et al., "Maltodextrin molecular weight distribution influence on the glass transition temperature and viscosity in aqueous solutions", Carbohydrate Polymers, 58, pp. 323-334 (2004).
Blamire, John, "Science at a Distance", Science at a Distance, accessed Jun. 17, 2013, http://www.brooklyn.cuny.edu/bc/ahp/SDPS/SD.PS.polymers.html.
ChemSpider, D-Glucose, Jun. 18, 2013, 4 pages.
Dokic, et al., "Molecular characteristics of maltodextrins and rheological behaviour of diluted and concentrated solutions", Colloids and Surfaces, A: Physiocochemical and Engineering Aspects, 141, pp. 435-440 (1998).
Filton, "Rapid Determination of Dextrose Equivalent by Cryoscopy", Oct. 22, 2006, Starch, vol. 31, issue 11, pp. 381-384.
Kearsley, M, Physical and Chemical Properties of Glucose Syrups, Handbook of Starch Hydrolysis Products and their Derivatives, Chapman and Hall, 1995.
Kim et al., "Characterization of Poly(styrene-b-vinylbenzylphosphonic acid) Copolymer by Titration and Thermal Analysis", Macromolecular Research, 2007, vol. 15. No. 6, pp. 587-594.
Messina, M.J., "Legumes and soybeans: overview of their nutritional profiles and heath effects", Am. J. of clinical Nutrition, vol. 70, No. 3, pp. 439S-450S, Sep. 1999.
Signet Chemical, Glucidex Maltodextrin, Apr. 16, 2013.
"LX Stretch Hood Typical Values", Lachenmeier, retrieved from web at www.lachenmeier.com.
Correspondence to the EPO from the Opponent/Respondent regarding Opposition to EP Application No. 03768889.2 (EP Patent No. 1578879) dated Feb. 14, 2013 from Opponent.
Communication from the EPO dated Nov. 8, 2012 regarding Summons to attend Oral Proceedings regarding Opposition to EP Application No. 03768889.2 (EP Patent No. 1578879).
Communication from the EPO dated Oct. 31, 2012 regarding Preparation for Oral Proceedings—Instructions to Support Service regarding Opposition to EP Application No. 03768889.2 (EP Patent No. 1578879).
Correspondence to the EPO dated Oct. 19, 2012 from the Patentee responding to communication dated Jun. 19, 2012 regarding Opposition to EP Application No. 03768889.2 (EP Patent No. 1578879).
Correspondence to the EPO dated Oct. 18, 2012 from the Opponent/Respondent responding to communication dated Jun. 19, 2012 regarding Opposition to EP Application No. 03768889.2 (EP Patent No. 1578879).
Communication from the EPO dated Jun. 19, 2012 regarding Opposition to EP Application No. 03768889.2 (EP Patent No. 1578879).
Correspondence to the EPO dated Jun. 1, 2012 from the Patentee regarding Opposition to EP Application No. 03768889.2 (EP Patent No. 1578879).

(56) References Cited

OTHER PUBLICATIONS

Communication from the Boards of Appeal of the European Patent Office regarding Decision dated Apr. 5, 2012 regarding Opposition to EP Application No. 03768889.2 (EP Patent No. 1578879).
Communication from the EPO regarding Minutes of the Public Oral Proceedings before the Technical Board of Appeal regarding Opposition to EP Application No. 03768889.2 (EP Patent No. 1578879).
Correspondence to the EPO dated Apr. 3, 2012 from the Patentee regarding response to submission of Mar. 20, 2012 by the Opponent/Respondent regarding Opposition to EP Application No. 03768889.2 (EP Patent No. 1578879).
Communication from the EPO dated Mar. 23, 2012 confirming Oral Proceeding date regarding Opposition to EP Application No. 03768889.2 (EP Patent No. 1578879).
Correspondence to the EPO dated Mar. 20, 2012 from the Opponent/Respondent regarding Opposition to EP Application No. 03768889.2 (EP Patent No. 1578879).
Correspondence to the EPO dated Mar. 2, 2012 from the Patentee regarding Opposition to EP Application No. 03768889.2 (EP Patent No. 1578879).
Office action from Chinese Application No. 201280018294.X dated Aug. 29, 2014.
Office action from U.S. Appl. No. 13/026,415 dated Jan. 13, 2015.
Office action from Chinese Application No. 201110401232.4 dated Nov. 25, 2014.
Office action from U.S. Appl. No. 12/825,375 dated Oct. 23, 2015.
Office action from U.S. Appl. No. 14/487,152 dated Oct. 26, 2015.
Communication from European Application No. 15152030.1 dated Aug. 3, 2015.
Office action from Japanese Application No. 2013-556848 dated Jul. 8, 2015.
Office action from U.S. Appl. No. 13/026,415 dated Jun. 3, 2015.
Office action from U.S. Appl. No. 13/234,336 dated May 4, 2015.
Communication from European Application No. 10768139.7 dated Apr. 7, 2015 received on Jun. 11, 2015.
Patent Examination Report from Australian Application No. 2010303254 dated May 8, 2015 received on Jun. 23, 2015.
Office action from Chinese Application No. 201080051943.7 dated Jun. 30, 2015.
Notice of Allowance from U.S. Appl. No. 14/51,660 dated Nov. 6, 2015.
Office action from U.S. Appl. No. 13/234,336 dated Dec. 15, 2015.
Office action from U.S. Appl. No. 13/187,650 dated Nov. 16, 2015.
Office action from U.S. Appl. No. 13/026,415 dated Dec. 2, 2015.
Spectrus NX1100, two page fact sheet from GE Power & Water, Water & Process Technologies, Jul. 2010.
Office action from U.S. Appl. No. 13/026,415 dated Apr. 20, 2016.
Office action from U.S. Appl. No. 12/825,375 dated Apr. 7, 2016.
Office action from U.S. Appl. No. 13/187,650 dated Mar. 28, 2016.
Office action from U.S. Appl. No. 13/187,650 dated Jul. 13, 2016.
Office action from Japanese Application No. 2013-556848 dated May 28, 2016.
de Meireless Brioude et al., "Synthesis and Characterization of Allphatic Polyesters from Glycerol, by-Product of Biodiesel Production, and Adipic Acid", Materials Research, vol. 10, No. 4, 335-339 2007.

D. Pramanick et al., "Synthesis and biodegradation of copolyesters from citric acid and glycerol", Polymer Bulletin 19, pp. 365-370 (1988).
Ronald Alan Holser, "Thermal Analysis of Glycerol Citrate/Starch Blends", Journal of Applied Polymer Science, vol. 110, pp. 1498-1508 (2008).
Nagata et al., "Synthesis and enzymatic degradation of regular network aliphatic polyesters", Reactive & Functional Polymers 30 (1996) pp. 165-171.
Shi et al., "Characterization of citric acid/glycerol co-plasticized thermoplastic starch prepared by melt blending", Carbohydrate Polymers 69, pp. 748-755 (2007).
Pachauri et al., "Value-added Utilization of Crude Glycerol from Biodiesel Production: A Survey of Current Research Activities", An ASABE meeting Presentation, Portland, Oregon, Jul. 9-12, 2006, Paper No. 066223.
Voit et al., "Hyperbranched and Highly Branched Polymer Architectures—Synthetic Strategies and Major Characterization Aspects", Chem. Rev. 2009, 109, pp. 5924-5973.
Jan Trenkel-Amoroso, "Synthesis, Degradation and Practical Applications of Glycerol/Citric Acid Condensation Polymer", A Thesis submitted to Oregon State University, presented Dec. 9, 2008, 66 pgs.
Unal, "Synthesis and Characterization of Branched Macromolecules for High Performance Elastomers, Fibers, and Films, "Dissertation submitted to the Virginia Polytechnic Institute and State University, Nov. 16, 2005, 240 pages.
Reddy et al. "Wet Cross-Linking Gliadin Fibers with Citric Acid and a Quantitative Relationship between Cross-Linking Conditions and Mechanical Properties", J. Agric. Food Chem., vol. 57, No. 1, pp. 90-98, 2009.
Reddy et al., "Citric acid cross-linking of starch films", Food Chemistry, vol. 118, pp. 702-711, 2010.
Welch et al., "Curing Agents having low or zero phosphorus content for formaldehyde free DP Finishing with Polycarboxylic Acids", Textile Chemist and Colorist Journal, vol. 25, No. 10, Oct. 1993, pp. 25-29.
Clark M. Welch, "Formaldehyde-Free Durable Press Finishing", Surfactant Science Series, vol. 94, pp. 1-32, 2001.
International Search Report and Written Opinion from PCT/US12/32118 dated Sep. 11, 2012.
Office action from U.S. Appl. No. 14/110,079 dated Jan. 28, 2016.
Office action from U.S. Appl. No. 14/565,545 dated Apr. 22, 2016.
Office action from U.S. Appl. No. 14/565,545 dated Jul. 27, 2016.
Notice of Allowance from U.S. Appl. No. 14/487,152 dated May 6, 2016.
Notice of Allowance from U.S. Appl. No. 13/026,415 dated Jul. 20, 2016.
Office action from U.S. Appl. No. 14/487,152 dated Jul. 14, 2016.
Office action from Canadian Application No. 2,777,078 dated Aug. 16, 2016.
Notice of Allowance from U.S. Appl. No. 14/487,152 dated Oct. 24, 2016.

\* cited by examiner

INSULATIVE PRODUCTS HAVING BIO-BASED BINDERS

CROSS REFERENCE TO RELATED APPLICATIONS

This application is a divisional application of U.S. Ser. No. 13/037,725, filed Mar. 1, 2011, titled "Insulative Products Having Bio-Based Binders", which is a continuation in part of U.S. patent application Ser. No. 12/900,540, filed Oct. 8, 2010, which claims priority benefits from U.S. Provisional Patent Application Ser. No. 61/250,187 entitled "Bio-Based Binders for Insulation And Non-Woven Mats" filed Oct. 9, 2009, the entire contents of which are expressly incorporated herein by reference in their entirety.

TECHNICAL FIELD AND INDUSTRIAL APPLICABILITY OF THE INVENTION

The present invention relates generally to fibrous insulation products and non-woven mats, and more particularly, to fibrous insulation products that contain a bio-based binder that contains no added formaldehyde and is environmentally friendly.

BACKGROUND OF THE INVENTION

Conventional fibers are useful in a variety of applications including reinforcements, textiles, and acoustical and thermal insulation materials. Although mineral fibers (e.g., glass fibers) are typically used in insulation products and non-woven mats, depending on the particular application, organic fibers such as polypropylene, polyester, and multi-component fibers may be used alone or in combination with mineral fibers in forming the insulation product or non-woven mat.

Fibrous insulation is typically manufactured by fiberizing a molten composition of polymer, glass, or other mineral and spinning fine fibers from a fiberizing apparatus, such as a rotating spinner. To form an insulation product, fibers produced by the rotating spinner are drawn downwardly from the spinner towards a conveyor by a blower. As the fibers move downward, a binder material is sprayed onto the fibers and the fibers are collected into a high loft, continuous blanket on the conveyor. The binder material gives the insulation product resiliency for recovery after packaging and provides stiffness and handleability so that the insulation product can be handled and applied as needed in the insulation cavities of buildings. The binder composition also provides protection to the fibers from interfilament abrasion and promotes compatibility between the individual fibers.

The blanket containing the binder-coated fibers is then passed through a curing oven and the binder is cured to set the blanket to a desired thickness. After the binder has cured, the fiber insulation may be cut into lengths to form individual insulation products, and the insulation products may be packaged for shipping to customer locations. One typical insulation product produced is a flexible insulation batt or blanket, which is suitable for use as wall insulation in residential dwellings or as insulation in the attic and floor insulation cavities in buildings. Another common insulation product is air-blown or loose-fill insulation, which is suitable for use as sidewall and attic insulation in residential and commercial buildings as well as in any hard-to-reach locations. Loose-fill insulation is formed of small cubes that are cut from insulation blankets, compressed, and packaged in bags.

Non-woven mats may be formed by conventional wet-laid processes. For example, wet chopped fibers are dispersed in a water slurry that contains surfactants, viscosity modifiers, defoaming agents, and/or other chemical agents. The slurry containing the chopped fibers is then agitated so that the fibers become dispersed throughout the slurry. The slurry containing the fibers is deposited onto a moving screen where a substantial portion of the water is removed to form a web. A binder is then applied, and the resulting mat is dried to remove any remaining water and cure the binder. The formed non-woven mat is an assembly of dispersed, individual glass filaments. An air-laid process is similar except that glass fibers are dispersed in a stream of air rather than in a water slurry.

Various attempts have been made to reduce undesirable formaldehyde emissions from formaldehyde-based resins. For example, various formaldehyde scavengers such as ammonia and urea have been added to the formaldehyde-based resin in an attempt to reduce formaldehyde emission from the insulation product. Because of its low cost, urea is added directly to the uncured resin system to act as a formaldehyde scavenger. The addition of urea to the resin system produces urea-extended phenol-formaldehyde resole resins. These resole resins can be further treated or applied as a coating or binder and then cured. Unfortunately, the urea-extended resoles are unstable, and because of this instability, the urea-extended resoles must be prepared on site. In addition, the binder inventory must be carefully monitored to avoid processing problems caused by undesired crystalline precipitates of dimer species that may form during storage. Ammonia is not a particularly desirable alternative to urea as a formaldehyde scavenger because ammonia generates an unpleasant odor and may cause throat and nose irritation to workers. Further, the use of a formaldehyde scavenger in general is undesirable due to its potential adverse affects to the properties of the insulation product, such as lower recovery and lower stiffness.

In addition, previous arts have focused on the use of polyacrylic acid with a polyhydroxy crosslinking agent or carbohydrate-based chemistry that is linked to the Maillard reaction. Polyacrylic acid binders, however, have several drawbacks. For example, polyacrylic acid binders use petroleum based materials and costs typically at least two times that of current phenolic binder systems. In addition, the high viscosity and different cure characteristics pose process difficulties. Also, Maillard reaction-based products have an undesirable dark brown color after curing. Further, the use of large amounts of ammonia needed to make the binder presents a safety risk and possible emission problems.

In view of the existing problems with current binders, there remains a need in the art for a binder system that is not petroleum dependent, has no added formaldehyde, is bio-based and environmentally friendly, and is cost competitive.

SUMMARY OF THE INVENTION

It is an object of the present invention to provide a binder composition for use in the formation of fiberglass insulation and non-woven chopped strand mats that includes at least one carbohydrate that is natural in origin and at least one crosslinking agent. The carbohydrate and crosslinking agent form a polyester thermoset resin. The carbohydrate may have a dextrose equivalent (DE) from 2 to 20. Additionally, the carbohydrate may be a water-soluble polysaccharide selected from pectin, dextrin, maltodextrin, starch, modified starch, starch derivatives and combinations thereof. The crosslinking agent may be selected from polycarboxylic acids, salts of polycarboxylic acid, anhydrides, monomeric and polymeric polycarboxylic acid with anhydride, citric acid, salts of citric acid, adipic acid, salts of adipic acid, polyacrylic acid, salts of polyacrylic acid, polyacrylic acid based resins, and combinations thereof. In one or more embodiments, the crosslinking agent may be citric acid or any monomeric or polymeric polycarboxylic acid and their corresponding salts. In some exemplary embodiments, the binder composition may include a moisture resistant agent and a pH adjuster. The binder composition is free of added formaldehyde and is environmentally friendly.

It is another object of the present invention to provide a fibrous insulation product that includes a plurality of randomly oriented fibers and a binder composition applied to at least a portion of the fibers and interconnecting the fibers. The binder includes at least one carbohydrate that is natural in origin and at least one crosslinking agent. Typically the carbohydrate will have reactive hydroxyl groups and the crosslinking agent will have reactive carboxyl groups. The carbohydrate may have a dextrose equivalent (DE) from 2 to 20. In exemplary embodiments, the carbohydrate is a water-soluble polysaccharide selected from pectin, dextrin, maltodextrin, starch, modified starch, starch derivatives, and combinations thereof. The binder composition may also include one or more members selected from a catalyst, a coupling agent, a process aid, a crosslinking density enhancer, an extender, a moisture resistant agent, a dedusting oil, a colorant, a corrosion inhibitor, a surfactant, and a pH adjuster. The process aid agent includes a polyol such as glycerol, triethanolamine, polyethylene glycol, and pentaerythritol. In one or more embodiment, the crosslinking agent may be citric acid or any monomeric or polymeric polycarboxylic acid and their corresponding salts. Additionally, in low density products (e.g., residential insulation products), the binder has a light (e.g., white or tan) color after it has been cured.

It is yet another object of the present invention to provide a non-woven chopped strand mat formed of a plurality of randomly oriented glass fibers having a discrete length enmeshed in the form of a mat having a first major surface and a second major surface and a binder composition at least partially coating the first major surface of the mat. The binder includes (1) at least one carbohydrate that is natural in origin and has a dextrose equivalent from 2 to 20 and (2) at least one crosslinking agent. The binder composition may also include one or more members selected from a catalyst, a moisture resistant agent, and a pH adjuster. In at least one exemplary embodiment, the carbohydrate is a water-soluble polysaccharide selected from pectin, dextrin, maltodextrin, starch, modified starch, starch derivatives and combinations thereof. In addition, the crosslinking agent may be selected from polycarboxylic acids, salts of polycarboxylic acid, anhydrides, monomeric and polymeric polycarboxylic acid with anhydride, citric acid, salts of citric acid, adipic acid, salts of adipic acid, polyacrylic acid, salts of polyacrylic acid, polyacrylic acid based resins, amino alcohols, sodium metaborate, polyoxyalkyleneamines, polyamines, polyols, and combinations thereof. The binder has a light color upon curing, is environmentally friendly, and is free of added formaldehyde.

It is an advantage of the present invention that the carbohydrate is natural in origin and derived from renewable resources.

It is yet another advantage of the present invention that maltodextrin is readily available and is low in cost.

It is a further advantage of the present invention that insulation products and non-woven mats utilizing the inventive binder composition can be manufactured using current manufacturing lines, to make a variety of product shapes, densities and uses, thereby saving time and money.

It is another advantage of the present invention that the binder composition has no added formaldehyde.

It is also an advantage of the present invention that the final product has a light color that allows the use of dyes, pigments, or other colorants to yield a variety of colors for the insulation product. Additionally, when finishing the surface of a board product with paint or a veil of woven or non-woven fabric, it takes less paint or fabric weight to cover these lighter colored boards than prior boards.

It is a further advantage of the present invention that the binder composition has a reduction in particulate emission compared to conventional phenol/urea/formaldehyde binder compositions.

It is a feature of the present invention that the carbohydrate polymer may have a dextrose equivalent (DE) number from 2 to 20.

It is a feature of the present invention that the maltodextrin can form an aqueous mixture that can be applied by conventional binder applicators, including spray applicators.

It is a further feature of the present invention that the binder can be acidic, neutral, or basic.

It is another feature of the present invention that the inventive insulation products and non-woven mats have no added formaldehyde.

It is a further advantage of the present invention that the binder composition produces fibrous products, especially in lighter density products, that have a softer feel to the touch, which is advantageous to the installer or user of these fibrous products.

It s also a feature of the invention that the inventive binder composition can be useful for composite reinforcements, such as chopped strands, for use in thermoplastics, thermosets, and roofing applications. In addition, the inventive binders may be used in both single and multi-end rovings.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION AND PREFERRED EMBODIMENTS OF THE INVENTION

Figure 1:
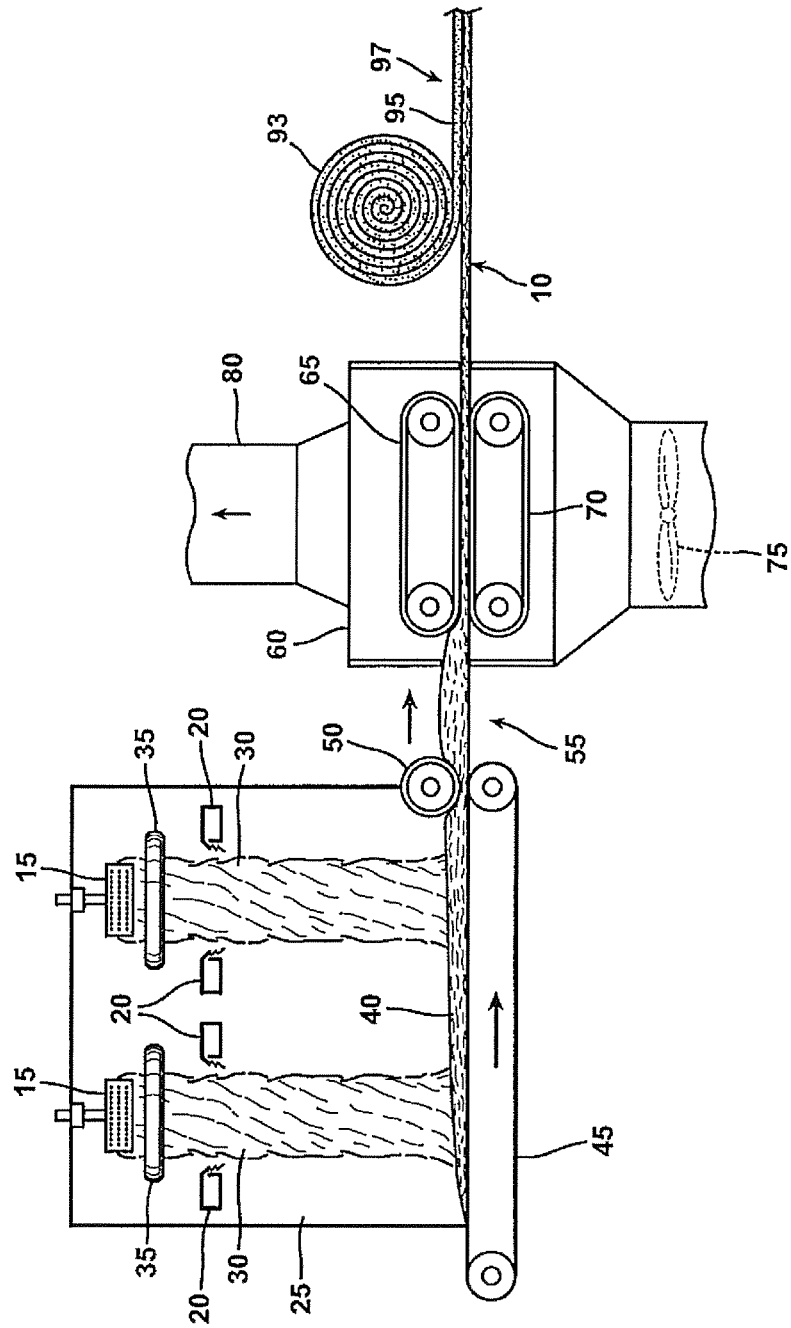
FIG. 1 is a schematic illustration of the formation of a faced insulation product with the inventive binder composition according to one exemplary embodiment.
Figure 2:
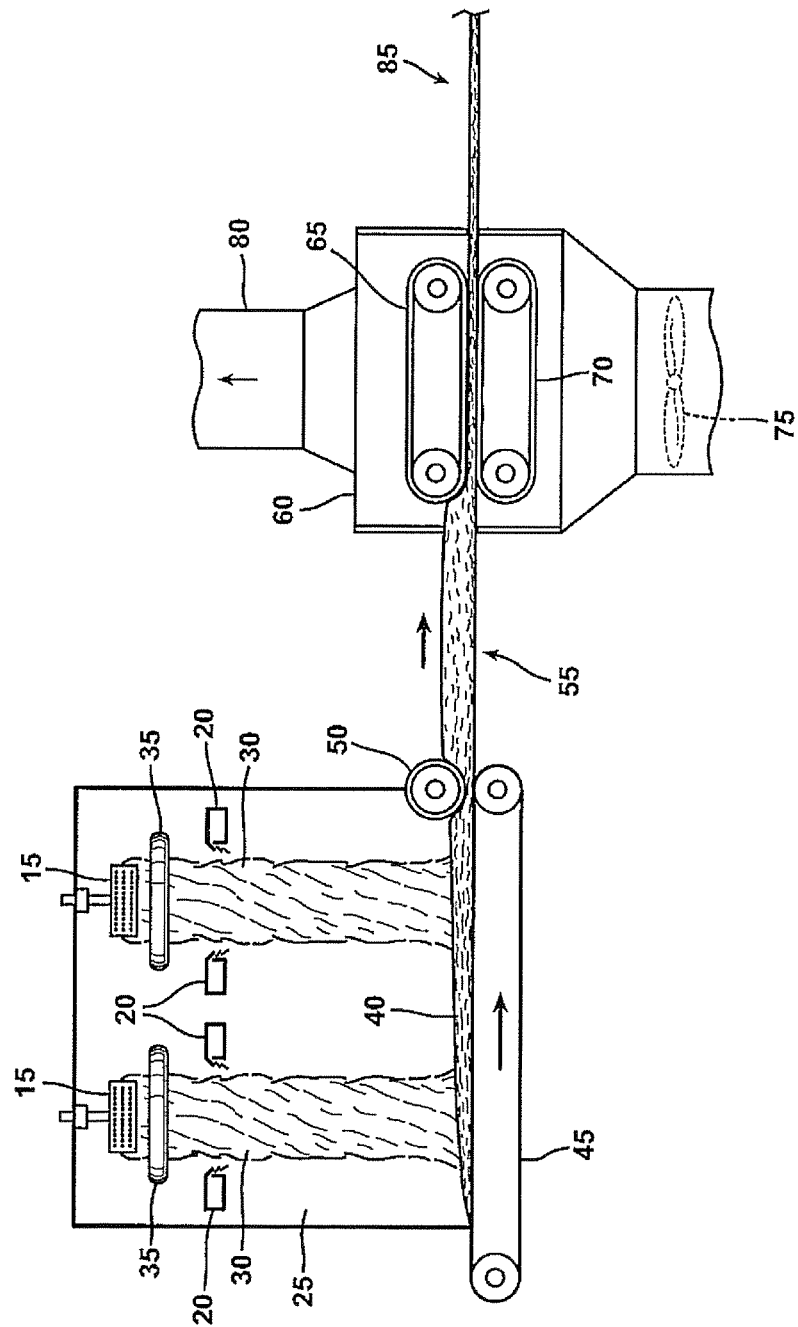
FIG. 2 is a is an elevational view of a manufacturing line for producing a fiberglass insulation product with the inventive binder composition where the insulation product does not contain a facing material according to another exemplary embodiment of the present invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references.

In the drawings, the thickness of the lines, layers, and regions may be exaggerated for clarity. It will be understood that when an element such as a layer, region, substrate, or panel is referred to as being "on" another element, it can be directly on the other element or intervening elements may also be present. Also, when an element is referred to as being "adjacent" to another element, the element may be directly adjacent to the other element or intervening elements may be present. The terms "top", "bottom", "side", and the like are used herein for the purpose of explanation only. Like numbers found throughout the figures denote like elements. It is to be noted that the phrase "binder", "bio-based binder", "binder composition", and "binder formulation" may be used interchangeably herein.

Bio-Based Binder Compositions

The present invention relates to environmentally friendly, aqueous polyester binder compositions that contain at least one bio-based component. In one exemplary embodiment, the bio-based component is a carbohydrate and the binder and includes a carbohydrate and a crosslinking agent. Typically the carbohydrate has reactive hydroxyl groups and the crosslinking agent has reactive carboxyl groups. In some exemplary embodiments, the carbohydrate-based binder composition also includes a coupling agent, a process aid agent, an extender, a pH adjuster, a catalyst, a crosslinking density enhancer, a deodorant, an antioxidant, a dust suppressing agent, a biocide, a moisture resistant agent, or combinations thereof. The binder may be used in the formation of insulation materials and non-woven chopped strand mats. In addition, the binder is free of added formaldehyde. Further, the binder composition has a reduction in particulate emission compared to conventional phenol/urea/formaldehyde binder compositions. The inventive binder may also be useful in forming particleboard, plywood, and/or hardboards.

In one or more exemplary embodiment, the binder includes at least one carbohydrate that is natural in origin and derived from renewable resources. For instance, the carbohydrate may be derived from plant sources such as legumes, maize, corn, waxy corn, sugar cane, milo, white milo, potatoes, sweet potatoes, tapioca, rice, waxy rice, peas, sago, wheat, oat, barley, rye, amaranth, and/or cassava, as well as other plants that have a high starch content. The carbohydrate polymer may also be derived from crude starch-containing products derived from plants that contain residues of proteins, polypeptides, lipids, and low molecular weight carbohydrates. The carbohydrate may be selected from monosaccharides (e.g., xylose, glucose, and fructose), disaccharides (e.g., sucrose, maltose, and lactose), oligosaccharides (e.g., glucose syrup and fructose syrup), and polysaccharides and water-soluble polysaccharides (e.g., pectin, dextrin, maltodextrin, starch, modified starch, and starch derivatives).

The carbohydrate polymer may have a number average molecular weight from about 1,000 to about 8,000. Additionally, the carbohydrate polymer may have a dextrose equivalent (DE) number from 2 to 20, from 7 to 11, or from 9 to 14. The carbohydrates beneficially have a low viscosity and cure at moderate temperatures (e.g., 80-250° C.) alone or with additives. The low viscosity enables the carbohydrate to be utilized in a binder composition. In exemplary embodiments, the viscosity of the carbohydrate may be lower than 500 cps at 50% concentration and between 20 and 30° C. The use of a carbohydrate in the inventive binder composition is advantageous in that carbohydrates are readily available or easily obtainable and are low in cost.

In at least one exemplary embodiment, the carbohydrate is a water-soluble polysaccharide such as dextrin or maltodextrin. The carbohydrate polymer may be present in the binder composition in an amount from about 40% to about 95% by weight of the total solids in the binder composition, from about 50% to about 95% by weight of the total solids in the binder composition, from about 60% to about 90%, or from about 70% to about 85%. As used herein, % by weight indicates % by weight of the total solids in the binder composition.

In addition, the binder composition contains a crosslinking agent. The crosslinking agent may be any compound suitable for crosslinking the carbohydrate. In exemplary embodiments, the crosslinking agent has a number average molecular weight greater than 90, from about 90 to about 10,000, or from about 190 to about 4,000. In some exemplary embodiments, the crosslinking agent has a number average molecular weight less than about 1000. Non-limiting examples of suitable crosslinking agents include polycarboxylic acids (and salts thereof), anhydrides, monomeric and polymeric polycarboxylic acid with anhydride (i.e., mixed anhydrides), citric acid (and salts thereof, such as ammonium citrate), 1,2,3,4-butane tetracarboxylic acid, adipic acid (and salts thereof), polyacrylic acid (and salts thereof), and polyacrylic acid based resins such as QXRP 1734 and Acumer 9932, both commercially available from The Dow Chemical Company. In exemplary embodiments, the crosslinking agent may be any monomeric or polymeric polycarboxylic acid, citric acid, and their corresponding salts. The crosslinking agent may be present in the binder composition in an amount up to about 50% by weight of the binder composition. In exemplary embodiments, the crosslinking agent may be present in the binder composition in an amount from about 5.0% to about 40% by weight of the total solids in the binder composition or from about 10% to about 30% by weight.

Optionally, the binder composition may include a catalyst to assist in the crosslinking. The catalyst may include inorganic salts, Lewis acids (i.e., aluminum chloride or boron trifluoride), Bronsted acids (i.e., sulfuric acid, p-toluenesulfonic acid and boric acid) organometallic complexes (i.e., lithium carboxylates, sodium carboxylates), and/or Lewis bases (i.e., polyethyleneimine, diethylamine, or triethylamine). Additionally, the catalyst may include an alkali metal salt of a phosphorous-containing organic acid; in particular, alkali metal salts of phosphorus acid, hypophosphorus acid, or polyphosphoric acids. Examples of such phosphorus catalysts include, but are not limited to, sodium hypophosphite, sodium phosphate, potassium phosphate, disodium pyrophosphate, tetrasodium pyrophosphate, sodium tripolyphosphate, sodium hexamethaphosphate, potassium phosphate, potassium tripolyphosphate, sodium trimetaphosphate, sodium tetramethaphosphate, and mixtures thereof. In addition, the catalyst or cure accelerator may be a fluoroborate compound such as fluoroboric acid, sodium tetrafluoroborate, potassium tetrafluoroborate, calcium tetrafluoroborate, magnesium tetrafluoroborate, zinc tetrafluoroborate, ammonium tetrafluoroborate, and mixtures thereof. Further, the catalyst may be a mixture of phosphorus and fluoroborate compounds. Other sodium salts such as, sodium sulfate, sodium nitrate, sodium carbonate may also or alternatively be used as the catalyst/accelerator. The catalyst or cure accelerator may be present in the binder composition in an amount from about 0% to about 10% by weight of the total solids in the binder composition, or from about 1.0% to about 5.0% by weight, or from about 3.0% to about 5.0% by weight.

The binder composition may optionally contain at least one coupling agent. In at least one exemplary embodiment, the coupling agent is a silane coupling agent. The coupling agent(s) may be present in the binder composition in an amount from about 0.01% to about 5.0% by weight of the total solids in the binder composition, from about 0.01% to about 2.5% by weight, or from about 0.1% to about 0.5% by weight.

Non-limiting examples of silane coupling agents that may be used in the binder composition may be characterized by the functional groups alkyl, aryl, amino, epoxy, vinyl, methacryloxy, ureido, isocyanato, and mercapto. In exemplary embodiments, the silane coupling agent(s) include silanes containing one or more nitrogen atoms that have one or more functional groups such as amine (primary, secondary, tertiary, and quaternary), amino, imino, amido, imido, ureido, or isocyanato. Specific, non-limiting examples of suitable silane coupling agents include, but are not limited to, aminosilanes (e.g., 3-aminopropyltriethoxysilane and 3-aminopropyl-trihydroxysilane), epoxy trialkoxysilanes (e.g., 3-glycidoxypropyltrimethoxysilane and 3-glycidoxypropyltriethoxysilane), methyacryl trialkoxysilanes (e.g., 3-methacryloxypropyltrimethoxysilane and 3-methacryloxypropyltriethoxysilane), hydrocarbon trialkoxysilanes, amino trihydroxysilanes, epoxy trihydroxysilanes, methacryl trihydroxy silanes, and/or hydrocarbon trihydroxysilanes. In one or more exemplary embodiment, the silane is an aminosilane, such as γ-aminopropyltriethoxysilane.

Further exemplary coupling agents (including silane coupling agents) suitable for use in the binder composition are set forth below:

Acryl: 3-acryloxypropyltrimethoxysilane; 3-acryloxypropyltriethoxysilane; 3-acryloxypropylmethyldimethoxysilane; 3-acryloxypropylmethyldiethoxysilane; 3-methacryloxypropyltrimethoxysilane; 3-methacryloxypropyltriethoxysilane Amino: aminopropylmethyldimethoxysilane; aminopropyltriethoxysilane; aminopropyltrimethoxysilane/EtOH; aminopropyltrimethoxysilane; N-(2-aminoethyl)-3-aminopropyltrimethoxysilane; N-(2-aminoethyl)-3-aminopropylmethyldimethoxysilane; (2-aminoethyl)-(2-aminoethyl) 3-aminopropyltrimethoxysilane; N-phenylaminopropyltrimethoxysilane Epoxy: 3-Glycidoxypropylmethyldiethoxysilane; 3-glycidoxypropylmethyldimethoxysilane; 3-glycidoxypropyltriethoxysilane; 2-(3,4-eoxycyclohexyl)ethylmethyldimethoxysilane; 2-(3,4-epoxycyclohexyl) ethylmethyldiethoxysilane; 2-(3,4-epoxycyclohexyl) ethyltrimethoxysilane; 2-(3,4-Epoxycyclohexyl) ethyltriethoxysilane Mercapto: 3-mercaptopropyltrimethoxysilane; 3-Mercaptopropyltriethoxysilane; 3-mercaptopropylmethyldimethoxysilane; 3-Mercaptopropylmethyldiethoxysilane Sulfide: bis[3-(triethoxysilyl)propyl]-tetrasulfide; bis[3-(triethoxysilyl)propyl]-disulfide Vinyl: vinyltrimethoxysilane; vinyltriethoxysilane; vinyl tris(2-methoxyethoxy)silane; vinyltrichlorosilane; trimethylvinylsilane Alkyl: methyltrimethoxysilane; methyltriethoxysilane; dimethyldimethoxysilane; dimethyldiethoxysilane; tetramethoxysilane; tetraethoxysilane; ethyltriethoxysilane; n-propyltrimethoxysilane; n-propyltriethoxysilane; isobutyltrimethoxysilane; hexyltrimethoxysilane; hexyltriethoxysilane; octyltrimethoxysilane; decyltrimethoxysilane; decyltriethoxysilane; octyltriethoxysilane; tert-butyldimethylchlorosilane; cyclohexylmethyldimethoxysilane; dicylohexyldimethoxysilane; cyclohexylethyldimethoxysilane; t-butylmethyldimethoxysilane Chloroalkyl: 3-chloropropyltriethoxysilane; 3-chloropropyltrimethoxysilane; 3-chloropropylmethyldimethoxysilane Perfluoro: decafluoro-1,1,2,2-tetrahydrodecyetrimethoxysilane; ((heptadecafluoro-1,1,2,2-tetrahydrodecyl)trimethoxysilane Phenyl: phenyltrimethoxysilane; phenyltriethoxysilane; diphenyldiethoxysilane; diphenyldimethoxysilane; diphenyldichlorosilane Hydrolyzates of the silanes listed above Zirconates: zirconium acetylacetonate; zirconium methacrylate Titanates: tetra-methyl titanate; tetra-ethyl titanate; tetra-n-propyl titanate; tetra-isopropyl titanate; tetra-isobutyl titanate; tetra-sec-butyl titanate; tetra-tert-butyl titanate; mono n-butyl, trimethyl titanate; mono ethyl tricyclohexyl titanate; tetra-n-amyl titanate; tetra-n-hexyl titanate; tetra-cyclopentyl titanate; tetra-cyclohexyl titanate; tetra-n-decyl titanate; tetra n-dodecyl titanate; tetra(2-ethyl hexyl) titanate; tetra octylene glycol titanate ester; tetrapropylene glycol titanate ester; tetra benzyl titanate; tetra-p-chloro benzyl titanate; tetra 2-chloroethyl titanate; tetra 2-bromoethyl titanate; tetra 2-methoxyethyl titanate; tetra 2-ethoxyethyl titanate.

Especially suitable titanate ester stabilizers of the invention are proprietary titanate ester compositions manufactured under the trade name Tyzor® by DuPont de Nemours & Co., Inc. Non-limiting examples include Tyzor® titanate esters sold in the 100% form rather than as solutions, e.g., in a lower aliphatic alcohol, such as Tyzor® TBT (tetrabutyl titanate), Tyzor® TPT (tetraisopropyl titanate), and Tyzor® OG (tetraoctylene glycol titanate ester).

In addition, the binder composition may include a process aid (e.g., polyol) in addition to the carbohydrates described above. The process aid is not particularly limiting so long as the process aid functions to facilitate the processing of the fibers formation and orientation. The process aid can be used to improve binder application distribution uniformity, to reduce binder viscosity, to increase ramp height after forming, to improve the vertical weight distribution uniformity, and/or to accelerate binder de-watering in both forming and oven curing process. The process aid may be present in the binder composition in an amount from about 0% to about 25.0% by weight, from about 1.0% to about 20.0% by weight, or from about 5.0% to about 15.0% by weight.

Examples of processing aids include viscosity modifiers (e.g., glycerol, 1,2,4-butanetriol,1,4-butanediol, 1,2-propanediol, 1,3-propanediol, poly(ethylene glycol) and defoaming agents (e.g., emulsions and/or dispersions of mineral, paraffin, or vegetable oils, dispersions of polydimethylsiloxane (PDMS) fluids and silica which has been hydrophobized with polydimethylsiloxane or other materials, and particles made of amide waxes such as ethylenebisstearamide (EBS) or hydrophobized silica). A further process aid that may be utilized in the binder composition is a surfactant. One or more surfactant may be included in the binder composition to assist in binder atomization, wetting, and interfacial adhesion.

The surfactant is not particularly limited, and includes surfactants such as, but not limited to, ionic surfactants (e.g., sulfate, sulfonate, phosphate, and carboxylate); sulfates (e.g., alkyl sulfates, ammonium lauryl sulfate, sodium lauryl sulfate (SDS), alkyl ether sulfates, sodium laureth sulfate, and sodium myreth sulfate); amphoteric surfactants (e.g., alkylbetaines such as lauryl-betaine); sulfonates (e.g., dioctyl sodium sulfosuccinate, perfluorooctanesulfonate, perfluorobutanesulfonate, and alkyl benzene sulfonates); phosphates (e.g., alkyl aryl ether phosphate and alkyl ether phosphate); carboxylates (e.g., alkyl carboxylates, fatty acid salts (soaps), sodium stearate, sodium lauroyl sarcosinate, carboxylate fluorosurfactants, perfluoronanoate, and perfluorooctanoate); cationic (alkylamine salts such as laurylamine acetate); pH dependent surfactants (primary, secondary or tertiary amines); permanently charged quaternary ammonium cations (e.g., alkyltrimethylammonium salts, cetyl trimethylammonium bromide, cetyl trimethylammonium chloride, cetylpyridinium chloride, and benzethonium chloride); and zwitterionic surfactants, quaternary ammonium salts (e.g., lauryl trimethyl ammonium chloride and alkyl benzyl dimethylammonium chloride), and polyoxyethylenealkylamines.

Suitable nonionic surfactants that can be used in conjunction with this invention include polyethers (e.g., ethylene oxide and propylene oxide condensates, which include straight and branched chain alkyl and alkaryl polyethylene glycol and polypropylene glycol ethers and thioethers); alkylphenoxypoly(ethyleneoxy)ethanols having alkyl groups containing from about 7 to about 18 carbon atoms and having from about 4 to about 240 ethyleneoxy units (e.g., heptylphenoxypoly(ethyleneoxy) ethanols, and nonylphenoxypoly(ethyleneoxy) ethanols); polyoxyalkylene derivatives of hexitol including sorbitans, sorbides, mannitans, and mannides; partial long-chain fatty acids esters (e.g., polyoxyalkylene derivatives of sorbitan monolaurate, sorbitan monopalmitate, sorbitan monostearate, sorbitan tristearate, sorbitan monooleate, and sorbitan trioleate); condensates of ethylene oxide with a hydrophobic base, the base being formed by condensing propylene oxide with propylene glycol; sulfur containing condensates (e.g., those condensates prepared by condensing ethylene oxide with higher alkyl mercaptans, such as nonyl, dodecyl, or tetradecyl mercaptan, or with alkylthiophenols where the alkyl group contains from about 6 to about 15 carbon atoms); ethylene oxide derivatives of long-chain carboxylic acids (e.g., lauric, myristic, palmitic, and oleic acids, such as tall oil fatty acids); ethylene oxide derivatives of long-chain alcohols (e.g., octyl, decyl, lauryl, or cetyl alcohols); and ethylene oxide/propylene oxide copolymers.

In at least one exemplary embodiment, the surfactants are SURFONYL® 420, SURFONYL® 440, and SURFONYL® 465, which are ethoxylated 2,4,7,9-tetramethyl-5-decyn-4,7-diol surfactants (commercially available from Air Products and Chemicals, Inc. (Allentown, Pa.)), Stanfax (a sodium lauryl sulfate), Surfynol 465 (an ethoxylated 2,4,7,9-tetramethyl 5 decyn-4,7-diol), Triton™ GR-PG70 (1,4-bis (2-ethylhexyl) sodium sulfosuccinate), and Triton™ CF-10 (poly(oxy-1,2-ethanediyl), alpha-(phenylmethyl)-omega-(1,1,3,3-tetramethylbutyl)phenoxy). The surfactant may be present in the binder composition in an amount from 0.0% to about 10% by weight of the total solids in the binder composition, from about 0.01% to about 10% by weight, or from about 0.2% to about 5.0% by weight.

The binder composition may optionally include a corrosion inhibitor to reduce or eliminate any potential corrosion to the process equipment. The corrosion inhibitor can be chosen from a variety of agents, such as, for example, hexamine, benzotriazole, phenylenediamine, dimethylethanolamine, polyaniline, sodium nitrite, benzotriazole, dimethylethanolamine, polyaniline, sodium nitrite, cinnamaldehyde, condensation products of aldehydes and amines (imines), chromates, nitrites, phosphates, hydrazine, ascorbic acid, tin oxalate, tin chloride, tin sulfate, thiourea, zinc oxide, and nitrile. Alternatively, the corrosion can be reduced or eliminated by process control abatement, such as process water neutralization, removal of corrosive ingredients, and process water treatment to minimize the corrosivity. The corrosion inhibitor may be present in the binder composition in an amount from about 0% to about 15.0% by weight, from about 1.0% to about 5.0% by weight, or from about 0.2% to about 1.0% by weight.

Also, the binder composition may also contain one or more biocide such as 3-iodo-2propyl-n-butylcarbamate, carbamic acid, butyl-, 3-iodo-2-propynyl ester (IPBC), 2-bromo-2-nitropropane-1,3-diol, magnesium nitrate, 5-chloro-2-methyl-4-isothiazolin-3-one, magnesium chloride, sulfamic acid, N-bromo, sodium salt, diiodomethyl-p-tolysulfone, dibromoacetonitrile, and 2,2-dibromo-3-nitrilopropionamide to reduce or eliminate mold and fungal growth on the fiberglass product. The biocide may be present in the binder composition in an amount from about 0% to about 10.0% by weight, from about 0.05% to about 1.0% by weight, or from 0.1% to about 0.5% by weight.

Further, the binder composition may optionally include at least one crosslinking density enhancer to improve the degree of crosslinking of the carbohydrate based polyester binder. Crosslinking density enhancement can be achieved by increasing esterification between the hydroxyl and carboxylic acid groups and/or introducing free radical linkages to improve the strength of the thermoset resin. The esterification crosslinking density can be adjusted by changing the ratio between hydroxyl and carboxylic acid and/or adding additional esterification functional groups such as triethanolamine, diethanolamine, mono ethanolamine, 1-amino-2-propanol, 1,1'-aminobis,-2-propanol, 1,1,'1"nitrilotri-2-propanol, 2-methylaminoethanol, 2-dimethylaminoethanol, 2-(2-aminoethoxy)ethanol, 2{(2aminoethyl)amino}ethanol, 2-diethylaminoethanol, 2-butylaminoethanol, 2-dibutylaminoethanol, 2cyclohexylamincethanol, 2,2'-(methylamino)bis-ethanol, 2,2'-(butylamino)bis-ethanol, 1-methylamino-2propanol, 1-dimethylamino-2-propanol, 1-(2-aminoethylamino)-2-propanol, 1,1'-(methylimino)bis-2-propanol, 3-amino-1-propanol, 3-dimethylamino-1propanol, 2-amino-1-butanol, 1-ethylamino-2-butanol, 4-diethylamino-1-butanol, 1-diethylamino-2-butanol, 3-amino-2,2-dimethyl-1-propanol, 2,2-dimethyl-3-dimethylamino-1-propanol, 4-diethylamino-2-butyn-1-ol, 5-diethylamino-3-pentyne-2-ol, bis(2-hydroxypropyl)amine, as well as other alkanolamines, their mixtures, and their polymers. Another method to achieve crosslinking density enhancement is to use both esterification and free radical reaction for the crosslinking reactions. Chemicals that can be used for both reactions include maleic anhydride, maleic acid, or itaconic acid. The crosslinking density enhancer may be present in the binder composition in an amount from about 0% to about 25.0% by weight, from about 1.0.0% to about 20.0% by weight, or from about 5.0% to about 15.0% by weight.

The binder may also include organic and/or inorganic acids and bases in an amount sufficient to adjust the pH to a desired level. The pH may be adjusted depending on the intended application, or to facilitate the compatibility of the ingredients of the binder composition. In exemplary embodiments, the pH adjuster is utilized to adjust the pH of the binder composition to an acidic pH. Examples of suitable acidic pH adjusters include inorganic acids such as, but not limited to sulfuric acid, phosphoric acid and boric acid and also organic acids like p-toluenesulfonic acid, mono- or polycarboxylic acids, such as, but not limited to, citric acid, acetic acid and anhydrides thereof, adipic acid, oxalic acid, and their corresponding salts. Also, inorganic salts that can be acid precursors. The acid adjusts the pH, and in some instances, as discussed above, acts as a crosslinking agent. Optionally, organic and/or inorganic bases, such sodium hydroxide, ammonium hydroxide, and diethylamine, and any kind of primary, secondary, or tertiary amine (including alkanol amine), can be used for pH adjustment. The pH of the binder composition, when in an acidic state, may range from about 1 to about 6, and in some exemplary embodiments, from about 2 to about 5, including all amounts and ranges in between. In at least one exemplary embodiment, the pH of the binder composition is about 2.5. The pH adjuster in an acidic binder composition may be present in the binder composition in an amount sufficient to obtain the desired pH.

The binder composition may also contain a moisture resistant agent, such as a alum, aluminum sulfate, latex, a silicone emulsion, a poly(organosiloxane), a hydrophobic polymer emulsion (e.g., polyethylene emulsion or polyester emulsion), and mixtures thereof. For clarity, a poly(organosiloxane) is a polymer of the form —(—$R_1SiR_2$—)$_n$— wherein at least one of $R_1$ and $R_2$ is an organic radical, including, e.g. alkyl or alkenyl, phenyl, etc. In at least one exemplary embodiment, the latex system is an aqueous latex emulsion. The latex emulsion includes latex particles that are typically produced by emulsion polymerization. In addition to the latex particles, the latex emulsion may include water, a stabilizer such as ammonia, and a surfactant. The moisture resistant agent may be present in the binder composition in an amount from 0% to about 20% by weight of the total solids in the binder composition, from about 5.0% to about 10% by weight, or from about 5.0% to about 7.0% by weight.

Additionally, the binder may contain a dust suppressing agent to reduce or eliminate the presence of inorganic and/or organic particles which may have adverse impact in the subsequent fabrication and installation of the insulation materials. The dust suppressing agent can be any conventional mineral oil, mineral oil emulsion, natural or synthetic oil, bio-based oil, or lubricant, such as, but not limited to, silicone and silicone emulsions, polyethylene glycol, as well as any petroleum or non-petroleum oil with a high flash point to minimize the evaporation of the oil inside the oven.

In addition, the binder may optionally include at least one extender to improve the binder's appearance and/or to lower the overall manufacturing cost. The extender can be an inorganic filler, such as tin oxide or calcium carbonate or organic materials such as lignin, lignin sulfonate, or a protein-based biomass. In exemplary embodiments, the extender is a protein-containing biomass. Like the carbohydrate, the protein-containing biomass is natural in origin and is derived from renewable resources. For instance, the protein may be derived from plant sources such as soy (e.g., a soy flour), peanuts, sunflowers, kidney beans, walnuts, or from other plants that have a high protein content. Alternatively, the protein may come from animal sources such as, but not limited to, eggs, blood, and animal tissue (e.g., beef, pork, or chicken, as well as fish). The protein-containing biomass may contain up to about 95% protein, and in exemplary embodiments, up to 90%, 75%, or 50% protein. As used herein, the term "protein" may be defined as a macromolecule composed of one or more polypeptides and includes any combination of polypeptides regardless its amino acid sequence. In addition, the term "protein" is intended to include all possible structures in which a protein can be obtained naturally or a protein that has been modified to improve its reactivity. It is to be appreciated that derivatives of natural proteins and synthetic proteins are also included within the scope of the term "protein". In one or more exemplary embodiment, the protein-containing biomass is soy flour. The extender may be present in the binder composition in an amount from about 0% to about 70.0% by weight of the total solids in the binder composition, from about 5.0% to about 50.0% by weight, or from about 10.0% to about 40.0% by weight.

The binder may optionally contain conventional additives such as, but not limited to dyes, pigments, fillers, colorants, UV stabilizers, thermal stabilizers, anti-foaming agents, anti-oxidants, emulsifiers, preservatives (e.g., sodium benzoate), corrosion inhibitors, and mixtures thereof. Other additives may be added to the binder composition for the improvement of process and product performance. Such additives include lubricants, wetting agents, surfactants, antistatic agents, and/or water repellent agents. Additives may be present in the binder composition from trace amounts (such as <about 0.1% by weight the binder composition) up to about 10.0% by weight of the total solids in the binder composition. In some exemplary embodiments, the additives are present in an amount from about 0.1% to about 5.0% by weight of the total solids in the binder composition, from about 1.0% to about 4.0% by weight, or from about 1.5% to about 3.0% by weight.

The binder further includes water to dissolve or disperse the active solids for application onto the reinforcement fibers. Water may be added in an amount sufficient to dilute the aqueous binder composition to a viscosity that is suitable for its application to the reinforcement fibers and to achieve a desired solids content on the fibers. In particular, the binder composition may contain water in an amount from about 50% to about 98.0% by weight of the total solids in the binder composition.

The binder composition may be made by dissolving or dispersing the crosslinking agent in water to form a mixture. Next, the carbohydrate may be mixed with the crosslinking agent in the mixture to form the binder composition. If desired, a cure accelerator (i.e., catalyst) may be added to the binder composition. The binder composition may be further diluted with water to obtain a desired amount of solids. If necessary, the pH of the mixture may be adjusted to the desired pH level with organic and inorganic acids and bases.

In the broadest aspect of the invention, the carbohydrate-based binder composition is formed of a carbohydrate (e.g., maltodextrin) and a crosslinking agent (e.g., polyacrylic acid or citric acid). The range of components used in the inventive binder composition according to embodiments of the invention is set forth in Table 1.

TABLE 1

| Component | % By Weight of Total Solids |
| --- | --- |
| Carbohydrate | 60.0-95.0 |
| Crosslinking Agent | 5.0-40.0 |

Aqueous binder compositions according to other exemplary embodiments of the present invention that include a process aid agent (e.g., glycerol) or low molecular weight carbohydrate are set forth in Table 2.

TABLE 2

| Component | % By Weight of Total Solids |
| --- | --- |
| Carbohydrate | 5.0-90.0 |
| Process Aid Agent | 1.0-40.0 |
| Crosslinking Agent | 5.0-40.0 |

Aqueous binder compositions according to further exemplary embodiments of the present invention that include a process aid agent and a catalyst/cure accelerator are set forth in Table 3.

TABLE 3

| Component | % By Weight of Total Solids |
| --- | --- |
| Carbohydrate | 5.0-90.0 |
| Process Aid Agent | 1.0-40.0 |
| Crosslinking Agent | 5.0-40.0 |
| Catalyst/Cure Accelerator | 1.0-5.0 |

Fibrous Products with Bio-Based Binders

In one exemplary embodiment, the binder composition is used to form a fibrous product, typically an insulation product. Fibrous products are generally formed of matted inorganic fibers bonded together by a cured thermoset polymeric material. Examples of suitable inorganic fibers include glass fibers, wool glass fibers, and ceramic fibers. Optionally, other reinforcing fibers such as natural fibers and/or synthetic fibers such as polyester, polyethylene, polyethylene terephthalate, polypropylene, polyamide, aramid, and/or polyaramid fibers may be present in the insulation product in addition to the glass fibers. The term "natural fiber" as used in conjunction with the present invention refers to plant fibers extracted from any part of a plant, including, but not limited to, the stem, seeds, leaves, roots, or phloem. Examples of natural fibers suitable for use as the reinforcing fiber material include basalt, cotton, jute, bamboo, ramie, bagasse, hemp, coir, linen, kenaf, sisal, flax, henequen, and combinations thereof. Insulation products may be formed entirely of one type of fiber, or they may be formed of a combination of types of fibers. For example, the insulation product may be formed of combinations of various types of glass fibers or various combinations of different inorganic fibers and/or natural fibers depending on the desired application for the insulation. The embodiments described herein are with reference to insulation products formed primarily of glass fibers.

The term "fibrous products" is general and encompasses a variety of compositions, articles of manufacture, and manufacturing processes. "Fibrous products" may be characterized and categorized by many different properties; density for example, which may range broadly from about 0.2 pounds/cubic foot ("pcf") to as high as about 10 pcf, depending on the product. Low density flexible insulation batts and blankets typically have densities between about 0.2 pcf and about 5 pcf, more commonly from about 0.3 to about 4 pcf. Fibrous products also include higher density products having densities from about 1 to about 10 pcf, more typically from about 2 or 3 pcf to about 8 pcf, such as boards and panels or formed products. Higher density insulation products may be used in industrial and/or commercial applications, including but not limited to metal building insulation, pipe or tank insulation, insulative ceiling and wall panels, duct boards and HVAC insulation, appliance and automotive insulation, etc.

Another property useful for categorization is the rigidity of the product. Residential insulation batts are typically quite flexible and they can be compressed into rolls or batts while recovering their "loft" upon decompression. In contrast, other fibrous products, such as ceiling tiles, wall panels, foundation boards and certain pipe insulation to mention a few, are quite rigid and inflexible by design. These products will flex very little and are unlikely to be adapted or conformed to a particular space.

Shape is another important property. Some fibrous products are flexible, as noted and can be forced to assume conforming shapes, while other are formed and shaped for a specific purpose. In some embodiments, the shape is substantially planar, as in duct boards, ceiling tiles and some wall insulation. In other embodiments, the fibrous insulation product is manufactured with a particular shape (e.g. cylindrical) suitable for a particular size conduit, pipe or tank. In other cases, specific shapes and cutouts, often die-cut, are included in certain appliance insulation products, automotive insulation products and the like. Finally, other shapes may be created with nonwoven textile insulation products.

Other classifications of fibrous insulation products can include the method of manufacture. The manufacture of glass fiber insulation may be carried out in a continuous process by rotary fiberization of molten glass, immediately forming a fibrous glass pack on a moving conveyor, and curing the binder on the fibrous glass insulation batt to form an insulation blanket as depicted in FIG. 1. Glass may be melted in a tank (not shown) and supplied to a fiber forming device such as a fiberizing spinner 15. The spinners 15 are rotated at high speeds. Centrifugal force causes the molten glass to pass through holes in the circumferential sidewalls of the fiberizing spinners 15 to form glass fibers. Glass fibers 30 of random lengths may be attenuated from the fiberizing spinners 15 and blown generally downwardly, that is, generally perpendicular to the plane of the spinners 15, by blowers 20 positioned within a forming chamber 25. It is to be appreciated that the glass fibers 30 may be the same type of glass or they may be formed of different types of glass. It is also within the purview of the present invention that at least one of the fibers 30 formed from the fiberizing spinners 15 is a dual glass fiber where each individual fiber is formed of two different glass compositions.

The blowers 20 turn the fibers 30 downward to form a fibrous batt 40. The glass fibers 30 may have a diameter from about 2 to about 9 microns, or from about 3 to about 6 microns. The small diameter of the glass fibers 30 helps to give the final insulation product a soft feel and flexibility.

The glass fibers, while in transit in the forming chamber 25 and while still hot from the drawing operation, are sprayed with the inventive aqueous binder composition by an annular spray ring 35 so as to result in a distribution of the binder composition throughout the formed insulation pack 40 of fibrous glass. Water may also be applied to the glass fibers 30 in the forming chamber 25, such as by spraying, prior to the application of the aqueous binder composition to at least partially cool the glass fibers 30. The binder may be present in an amount from about 1% to 30% by weight of the total fibrous product, more usually from about 2% to about 20% or from about 3% to about 14%. Binder content of the fibrous products is typically measured by loss on ignition or "LOI" of the cured product.

The glass fibers 30 having the uncured resinous binder adhered thereto may be gathered and formed into an uncured insulation pack 40 on an endless forming conveyor 45 within the forming chamber 25 with the aid of a vacuum (not shown) drawn through the fibrous pack 40 from below the forming conveyor 45. The residual heat from the glass fibers 30 and the flow of air through the fibrous pack 40 during the forming operation are generally sufficient to volatilize a majority of the water from the binder before the glass fibers 30 exit the forming chamber 25, thereby leaving the remaining components of the binder on the fibers 30 as a viscous or semi-viscous high-solids liquid.

The coated fibrous pack 40, which is in a compressed state due to the flow of air through the pack 40 in the forming chamber 25, is then transferred out of the forming chamber 25 under exit roller 50 to a transfer zone 55 where the pack 40 vertically expands due to the resiliency of the glass fibers. The expanded insulation pack 40 is then heated, such as by conveying the pack 40 through a curing oven 60 where heated air is blown through the insulation pack 40 to evaporate any remaining water in the binder, cure the binder, and rigidly bond the fibers together. Heated air is forced though a fan 75 through the lower oven conveyor 70, the insulation pack 40, the upper oven conveyor 65, and out of the curing oven 60 through an exhaust apparatus 80. The cured binder imparts strength and resiliency to the insulation blanket 10. It is to be appreciated that the drying and curing of the binder may be carried out in either one or two different steps. The two stage (two-step) process is commonly known as B-staging.

Also, in the curing oven 60, the insulation pack 40 may be compressed by upper and lower foraminous oven conveyors 65, 70 to form a fibrous insulation blanket 10. It is to be appreciated that the insulation blanket 10 has an upper surface and a lower surface. In particular, the insulation blanket 10 has two major surfaces, typically a top and bottom surface, and two minor or side surfaces with fiber blanket 10 oriented so that the major surfaces have a substantially horizontal orientation. The upper and lower oven conveyors 65, 70 may be used to compress the insulation pack 40 to give the insulation blanket 10 a predetermined thickness. It is to be appreciated that although FIG. 1 depicts the conveyors 65, 70 as being in a substantially parallel orientation, they may alternatively be positioned at an angle relative to each other (not illustrated).

The curing oven 60 may be operated at a temperature from about 100° C. to about 325° C., or from about 250° C. to about 300° C. The insulation pack 40 may remain within the oven for a period of time sufficient to crosslink (cure) the binder and form the insulation blanket 10. The inventive binder composition cures at a temperature that is lower than the curing temperature of conventional formaldehyde binders. This lower curing temperature requires less energy to heat the insulation pack, and non-woven chopped strand mat described in detail below, which results in lower manufacturing costs.

A facing material 93 may then be placed on the insulation blanket 10 to form a facing layer 95. Non-limiting examples of suitable facing materials 93 include Kraft paper, a foil-scrim-Kraft paper laminate, recycled paper, and calendared paper. The facing material 93 may be adhered to the surface of the insulation blanket 10 by a bonding agent (not shown) to form a faced insulation product 97. Suitable bonding agents include adhesives, polymeric resins, asphalt, and bituminous materials that can be coated or otherwise applied to the facing material 93. The faced fibrous insulation 97 may subsequently be rolled for storage and/or shipment or cut into predetermined lengths by a cutting device (not illustrated). Such faced insulation products may be used, for example, as panels in basement finishing systems, as duct-wrap, ductboard, as faced residential insulation, and as pipe insulation. It is to be appreciated that, in some exemplary embodiments, the insulation blanket 10 that emerges from the oven 60 is rolled onto a take-up roll or cut into sections having a desired length and is not faced with a facing material 94. Optionally, the insulation blanket 10 may be slit into layers and by a slitting device and then cut to a desired length (not illustrated).

A significant portion of the insulation placed in the insulation cavities of buildings is in the form of insulation blankets rolled from insulation products such as is described above. Faced insulation products are installed with the facing placed flat on the edge of the insulation cavity, typically on the interior side of the insulation cavity. Insulation products where the facing is a vapor retarder are commonly used to insulate wall, floor, or ceiling cavities that separate a warm interior space from a cold exterior space. The vapor retarder is placed on one side of the insulation product to retard or prohibit the movement of water vapor through the insulation product.

The presence of water, dust, and/or other microbial nutrients in the insulation product 10 may support the growth and proliferation of microbial organisms. Bacterial and/or mold growth in the insulation product may cause odor, discoloration, and deterioration of the insulation product 10, such as, for example, deterioration of the vapor barrier properties of the Kraft paper facing. To inhibit the growth of unwanted microorganisms such as bacteria, fungi, and/or mold in the insulation product 10, the insulation pack 40 may be treated with one or more anti-microbial agents, fungicides, and/or biocides. The anti-microbial agents, fungicides, and/or biocides may be added during manufacture or in a post manufacture process of the insulation product 10. It is to be appreciated that the insulation product using the inventive binder composition can be a fiberglass batt as depicted, or as loosefill insulation, ductboard, ductliner, or pipe wrap (not depicted in the Figures).

Formed or shaped products may include a further step, optionally during cure, that molds or shapes the product to its specific final shape. Rigid boards are a type of shaped product, the shape being planar. Other shaped products may be formed by dies or molds or other forming apparatus. Rigidity may be imparted by the use of higher density of fibers and/or by higher levels of binder application. As an alternative to rotary fiberizing, some fibrous insulation products, particularly higher density, non-woven insulation products, may be manufactured by an air-laid or wet-laid process using premade fibers of glass, other minerals or polymers that are scattered into a random orientation and contacted with binder to form the product.

Figure 3:
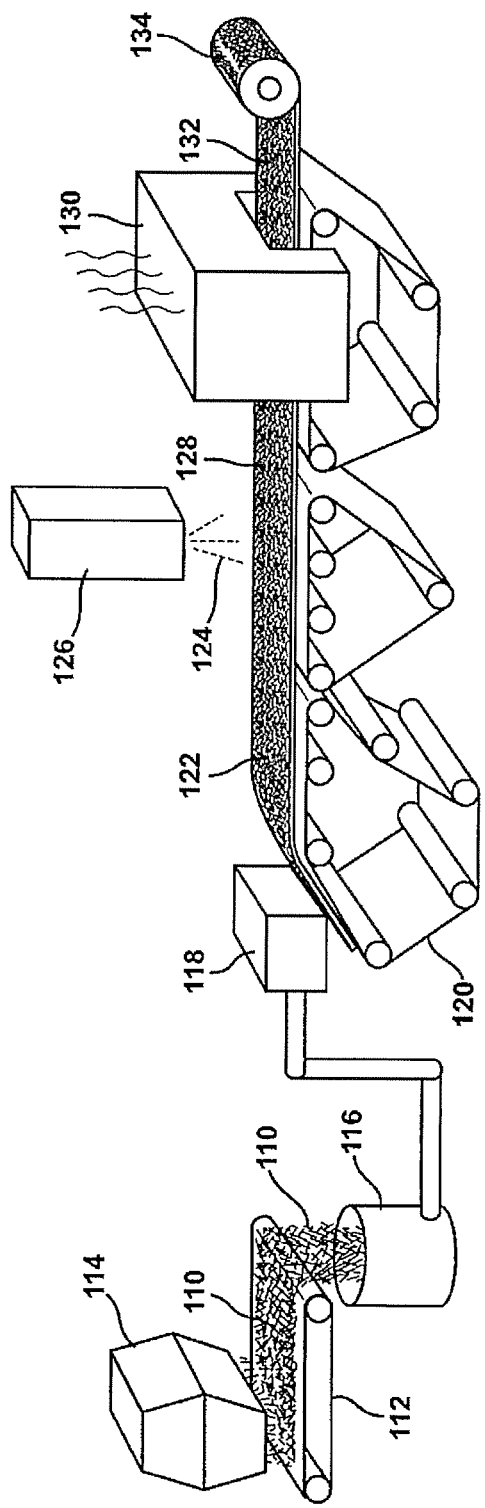
FIG. 3 is a schematic illustration of a wet-laid processing line for forming a chopped strand mat utilizing the inventive binder composition according a further exemplary embodiment of the present invention.

In another embodiment of manufacture, the binder composition may be used in combination with pre-manufactured fibers to form a non-woven chopped strand mat. In particular, binder is added during the formation of the chopped strand mat in a wet-laid or air-laid mat processing line, where the fibers are dispersed by a water (or air) fluid. One exemplary process of separately adding the coupling agent to the chopped strand mat is depicted in FIG. 3. It is to be appreciated that reference is made herein to glass fibers, although the chopped strand mat could be formed of, or include, non-glass fibers. Chopped glass fibers 100 may be provided to a conveying apparatus such as a conveyor 112 by a storage container 114 for conveyance to a mixing tank 116 that contains various surfactants, viscosity modifiers, defoaming agents, and/or other chemical agents with agitation to disperse the fibers and form a chopped glass fiber slurry (not shown). The glass fiber slurry may be transferred to a head box 118 where the slurry is deposited onto a conveying apparatus such as a moving screen or foraminous conveyor 120 and a substantial portion of the water from the slurry is removed to form a web (mat) 122 of enmeshed fibers. The water may be removed from the web 122 by a conventional vacuum or air suction system (not shown).

The inventive binder 124 is applied to the web 122 by a suitable binder applicator, such as the spray applicator 126 or a curtain coater (not illustrated). Once the binder 124 has been applied to the mat 122, the binder coated mat 128 is passed through at least one drying oven 130 to remove any remaining water and cure the binder composition 124. The formed non-woven chopped strand mat 132 that emerges from the oven 130 is an assembly of randomly oriented, dispersed, individual glass fibers. The chopped strand mat 132 may be rolled onto a take-up roll 134 for storage for later use as illustrated. The non-woven mat can be use in roofing, flooring, ceiling, wall applications, as filters, in ground based vehicles, and in aircraft.

In some cases, it is even possible to use scraps of continuous fibers, such as E-glass, and cut them to lengths suitable for fluid-dispersed manufacturing processes. In one embodiment of textile pipe insulation, lengths of scrap E-glass are cut ranging from about 0.5 to about 6 inches, nominally about 2 inches in length. These are dispersed by a fluid (water or air), the fluid is removed, and the fibers are sprayed with a bio-based binder which is cured as before.

Some exemplary fibrous products that can be manufactured using the bio-based binders according to the invention include those illustrated in Table A below.

TABLE A

Bio-based binder formulations for representative products*

| | Flexible Duct Media | Metal Building Insulation | Warm & Dry boards | Ceiling Tile boards | | |
|---|---|---|---|---|---|---|
| | | | | A | B | C |
| Maltodextrin | 65-70 | 65-70 | 65-70 | 65-70 | 45-50 | 55-60 |
| Citric Acid | 25-30 | 25-30 | 25-30 | 25-30 | 30-35 | 25-30 |
| Sodium hypophosphite | 2-5 | 2-5 | 2-5 | 2-5 | 2-5 | 2-5 |
| Glycerol | | | | | 10-15 | |
| Polyglycol | | | | | | 7-10 |
| Surfactant (e.g. SURFYNOL 465) | | | 0.1-0.3% | 0.1-0.3% | 0.1-0.3% | 0.1-0.3% |
| Organopolysiloxane moisture resistance additive (e.g. Polon MR) | Up to 0.5% | Up to 0.5% | 0.4-0.5% | Up to 0.5% | Up to 0.5% | Up to 0.5% |

*In Table A above, each ingredient of the binder composition is given as a range of typical values of percentage of dry weight of the binder composition.

Whereas examples 4, 5, 7, and 12 relate to flexible, light density residential insulation, examples 8, 9 and 10 further illustrate commercial fibrous products other than the typical flexible residential insulation. A more complete listing of non-residential insulation fibrous products that can be manufactured using a bio-based binder composition according to the invention is set forth in Table B, below.

measured using Instron. The loss on ignition (LOI) of the reinforcing fibers is the reduction in weight experienced by the fibers after heating them to a temperature sufficient to burn or pyrolyze the organic size from the fibers. The loss on ignition was measured according to the procedure set forth in TAPPI T-1013 OM06, Loss on Ignition of Fiberglass Mats (2006). To place the handsheet in a steam environment, the

TABLE B

Selected Commercial and Industrial Fibrous Products which may use a Bio-Based Binder

| | Rigid Boards | Flexible, Light Density Insulation | Rigid Pipe Insulation and pipe rolls | Textile E-glass Nonwoven |
|---|---|---|---|---|
| Density | Wide range of densities-from 1.5 to 10 pcf | Light density - Ranging from 0.3 to 4.0 pcf | Ranging from 3-6 pcf | Ranging from 0.8 to 4 pcf |
| Binder content | about 2 to about 20% LOI | about 2 to about 13% LOI | about 3 to about 15% LOI | about 5 to about 20% LOI |
| Manufacturing method | Rotary fiber forming process | Rotary fiber forming process | Rotary fiber forming process plus on or offline molding/pipe formation process | Air-laid nonwoven process |
| Exemplary Owens Corning Products | QUIET R Duct Board QUIET R Duct Liner Board 700 Series Insulation Insul-Quick Insulation SCR Insulation Board Curtainwall QuietZone Shaftwall Warm -N -Dri Energy Board TremDrain Exterior Foundation Barrier Board Ceiling Board Blanks | Certified R Metal Building Insulation ELAMINATOR ® Pre-Engineered Metal Roof Insulation MBI Plus Metal Bldg Utility Blanket Unfaced Metal Building Insulation for Canada Flexible Duct Media Insulation QUIET R Rotary Duct Liner SOFTR Duct Wrap FRK TIW Types I and II FLEX-Wrap for pipes and tanks H2V Series RA Series Select Sound Thermorange FlameSpread 25 Sonobatts Thermal Batts | EVOLUTION Paper-Free ASJ VAPORWICK Insulation FIBERGLAS ™ Pipe and Tank Insulation rolls | QUIET R Textile Duct Liner DURAFLEX Transportation |

There are numerous advantages provided by the inventive binder formulations. For example, unlike conventional urea-formaldehyde binders, inventive binders have a light color after curing (in low density products). In addition, the carbohydrate is natural in origin and derived from renewable resources. By lowering or eliminating formaldehyde emission, the overall volatile organic compounds (VOCs) emitted in the workplace are reduced. Additionally, because carbohydrates are relatively inexpensive, the insulation product or chopped fiber mat can be manufactured at a lower cost. Further, the binder has low to no odor, making it more desirable to work with.

Having generally described this invention, a further understanding can be obtained by reference to certain specific examples illustrated below which are provided for purposes of illustration only and are not intended to be all inclusive or limiting unless otherwise specified.

EXAMPLES

Example 1

The binder formulations set forth in Table 4 were utilized to form handsheets in the manner described in detail below. The nonwoven fiberglass handsheets were dried and cured for three minutes at 400° F. The tensile strength, the Loss on Ignition (LOI), and the tensile strength divided by the LOI (tensile strength/LOI) for each sample was determined under ambient and steam conditions. The tensile strength was handsheets were placed in an autoclave at 240° F. at a pressure between 400 and 500 psi for 30 minutes.

The handsheets were made according to the following procedure. First water is added to a bucket (approximately 5 liters). To this water, 8 drops of NALCO dispersant 01NM 159 was added. A pneumatic stirrer was lowered into the bucket and set at a slow speed so as to stir but not produce foam. To this stirring mixture, wet chop glass fibers (8 grams) were added and allowed to stir for 5 minutes. A screen catch was placed in a 12×12×12 inch 40 liter Williams standard pulp testing apparatus (a.k.a. a deckle box) and the box was closed. The deckle box was then filled with water to the "3" mark and a plate stirrer was placed in the deckle box. To the water in the deckle box, a 0.5% wt, solution of polyacrylamide, NALCO 7768, (80 grams) was added and mixed until dissolved using the plate stirrer. After the glass fiber water had stirred for 5 minutes, a 0.5% wt. solution of polyacrylamide, NALCO 7768 (80 grams) was added and stirred at low speed for one minute, after which the stirring speed was set to the highest setting and allowed to stir for an additional 2 minutes. The glass fiber solution is then immediately dumped into the deckle box and stirred with the plate stirrer for 10 rapid strokes. At this point, the valve on the decide box was depressed until the deckle box was empty. After the decide box was drained, the box was opened and the screen with the handsheet was removed from the base by holding opposite corners of the screen. The screen was then placed on a wooden frame and the bio-based binder was applied to the handsheet using a roll coater.

Excess binder was then vacuumed off. The binder-coated handsheet was placed into an oven for curing and cut into one inch strips. These strips were placed in a desiccator overnight.

The results of this experiment are set forth in Table 5. It is to be noted that the weights in Table 4 are expressed in grams (g).

the loss on ignition (LOI), and the tensile strength divided by the LOI (tensile strength/LOI) for each sample was determined under ambient and steam conditions. The steam conditions were identical to that set forth in Example 1. In addition, the loss on ignition and tensile strength of each the samples were measured according to the procedures

TABLE 4

| Component | Sample 1 (10% Acumer 9932) | Sample 2 (Control) | Sample 3 (20% Acumer 9932) | Sample 4 (20% Acumer 9932) | Sample 5 (20% Acumer 9932) | Sample 6 (15% Acumer 9932) |
| --- | --- | --- | --- | --- | --- | --- |
| Maltodextrin (DE 11.0) | | | | | 79.9 | |
| Maltodextrin (DE 18.0) | | | | 79.9 | | |
| Maltodextrin (DE 7.5) | 89.8 | | 79.9 | | | 84.9 |
| gamma-aminopropyl-trihydroxy-silane (1.24% solution) | 13.7 | 9.1 | 13.7 | 13.7 | 13.7 | 13.7 |
| Acumer 9932/Crosslinking Aged[1] | 20.8 | | 41.7 | 41.7 | 41.7 | 31.2 |
| Acrylic Binder QRXP 1734[2] | | 127.8 | | | | |
| Water | 675.7 | 663.1 | 664.8 | 664.8 | 664.8 | 670.2 |
| Total (g) | 800 | 800 | 800 | 800 | 800 | 800 |

[1]Acumer 9932: a polyacrylic acid resin (46% solids) commercially available from The Dow Chemical Company.
[2]QXRP 1734: a polyacrylic acid resin commercially available from The Dow Chemical Company.

TABLE 5

| | Sample 1 | Sample 2 | Sample 3 | Sample 4 | Sample 5 | Sample 6 |
| --- | --- | --- | --- | --- | --- | --- |
| Tensile Strength (lbf) | 20.7 | 30.4 | 20.9 | 20.6 | 29.3 | 26.1 |
| LOI (%) | 9.7 | 8.4 | 9.3 | 9.5 | 11.0 | 11.3 |
| Tensile/LOI | 2.1 | 3.6 | 2.3 | 2.2 | 2.7 | 2.3 |
| After Steam aging Tensile Strength (lbf) | 18.9 | 16.2 | 19.9 | 16.2 | 22.6 | 26.1 |
| After Steam aging LOI (%) | 9.9 | 9.5 | 9.8 | 9.4 | 10.5 | 11.3 |
| After Steam aging Tensile/LOI | 1.9 | 1.7 | 2.0 | 1.7 | 2.2 | 2.3 |

From the data set forth in Tables 4 and 5, it was concluded that the binder formulations demonstrated equal or better tensile strengths compared to tensile strengths of current commercially available products.

Example 2

The binder formulations set forth in Table 6 were utilized to form handsheets according to the procedure set forth in Example 1. The nonwoven fiberglass handsheets were dried and cured for three minutes at 400° F. The tensile strength, the loss on ignition (LOI), and the tensile strength divided by the LOI (tensile strength/LOI) for each sample was determined under ambient and steam conditions. The steam conditions were identical to that set forth in Example 1. In addition, the loss on ignition and tensile strength of each the samples were measured according to the procedures described in Example 1. The results are set forth in Table 7. It is to be noted that the weights in Table 6 are expressed in grams (g).

TABLE 6

| Component | Sample 1 10% Citric Acid 5% SHP | Sample 2 Control | Sample 3 20% Citric Acid 5% SHP | Sample 4 20% Citric Acid 5% SHP |
| --- | --- | --- | --- | --- |
| Maltodextrin (DE 11.0) | | | | 79.9 |
| Maltodextrin (DE 18.0) | | | 79.9 | |
| Maltodextrin (DE 7.5) | 89.8 | | | |
| gamma-aminopropyltri-hydroxy-silane (1.24% solution) | 13.7 | 13.7 | 13.7 | 13.7 |
| Citric Acid/Crosslinking Agent | 9.6 | | 19.2 | 19.2 |
| Acrylic Binder QRXP 1734[1] | | 191.7 | | |

TABLE 6-continued

| Component | Sample 1 10% Citric Acid 5% SHP | Sample 2 Control | Sample 3 20% Citric Acid 5% SHP | Sample 4 20% Citric Acid 5% SHP |
|---|---|---|---|---|
| Sodium Hypophosphite (SHP) | 4.8 | 4.8 | 4.8 | 4.8 |
| Water | 682.1 | 589.9 | 682.5 | 682.5 |
| Total (g) | 800 | 800 | 800 | 800 |

(1)QXRP 1734: a polyacrylic acid resin commercially available from The Dow Chemical Company.

TABLE 7

| | Sample 1 | Sample 2 Control | Sample 3 | Sample 4 |
|---|---|---|---|---|
| Tensile Strength (lbf) | 16.56 | 23.31 | 20.40 | 20.76 |
| LOI (%) | 9.12 | 7.20 | 7.99 | 8.69 |
| Tensile/LOI | 1.82 | 3.24 | 2.55 | 2.39 |
| After Steam aging Tensile Strength (lbf) | 15.67 | 13.01 | 13.03 | 14.86 |
| After Steam aging LOI (%) | 9.73 | 7.54 | 8.78 | 9.11 |
| After Steam aging Tensile/LOI | 1.61 | 1.73 | 1.48 | 1.63 |

From the data presented in Tables 6 and 7, it was concluded that binder formulations containing maltodexrin having different Dextrose Equivalents (DE) achieved tensile strengths, LOIs, and LOIs after steam aging that were better than or comparable to commercially available products.

Example 3

The binder formulations set forth in Table 8 were utilized to form handsheets according to the procedure set forth in Example 1. The nonwoven fiberglass handsheets were dried and cured for three minutes at 400° F. The tensile strength, the LOI, and the tensile strength/LOI for each sample were determined under ambient and steam conditions. The steam conditions were identical to that set forth in Example 1. In addition, the loss on ignition and tensile strength of each the samples were measured according to the procedures described in Example 1. The results are set forth in Table 9. It is to be noted that the weights in Table 8 are expressed in grams (g).

TABLE 8

| Component | Sample 1 70:30 MD-CA w/5% SHP | Sample 2 70:30 MD-CA w/5% SHP and 10% $H_3PO_4$ | Sample 3 70:30 MD-CA w/4% $H_3PO_2$ | Sample 4 70:30 MD-CA w/5% $AlCl_3$ | Sample 5 70:30 MD-CA w/3% Li-Carboxylate |
|---|---|---|---|---|---|
| Maltodextrin (DE 11.0) | 45.1 | 42.6 | 46.0 | 45.1 | 52.0 |
| Citric Acid | 19.3 | 14.2 | 19.2 | 19.3 | 23.3 |
| gamma-aminopropyl-trihydroxy-silane (1.24% solution) | 10.2 | 11.2 | 10.3 | 10.2 | 11.5 |
| Catalyst (Sodium Hypophosphite) | 4.1 | 4.5 | | | |
| Catalyst (85% H3PO4) | | 8.5 | | | |
| Catalyst (50% H3PO2) | | | 5.2 | | |
| Catalyst (55.2% AlCl$_3$) | | | | 6.1 | |
| Lithium Carboxylate (50% conc.) | | | | | 4.1 |
| Water (g) | 721.3 | 719.0 | 719.3 | 719.3 | 710.1 |

**MD = maltodextrin, CA = citric acid, SHP = sodium hypophosphite

TABLE 9

| | Sample 1 | Sample 2 | Sample 3 | Sample 4 | Sample 5 |
|---|---|---|---|---|---|
| Tensile Strength (lbf) | 14.40 | 11.87 | 11.08 | 6.54 | 15.94 |
| LOI (%) | 6.27 | 6.28 | 6.42 | 5.31 | 4.87 |
| Tensile/LOI | 2.30 | 1.89 | 1.73 | 1.23 | 3.28 |
| After Steam aging Tensile Strength (lbf) | 7.81 | 5.98 | 7.84 | 2.93 | 10.63 |
| After Steam aging LOI (%) | 6.95 | 6.27 | 6.80 | 5.44 | 5.33 |
| After Steam aging Tensile/LOI | 1.12 | 0.95 | 1.15 | 0.54 | 1.99 |

From the data set forth in Tables 8 and 9, it was concluded that bio-based binder formulations containing different catalysts achieved tensile strengths comparable to that of current commercially available products.

Example 4

The binder formulations set forth in Table 10 were utilized to form R-19 fiberglass insulation batts in a manner known by those of skill in the art. The R-19 fiberglass insulation batts had a target 6% LOI and were cured at 510° F. The mechanical properties of the batts at the end of the line were determined under ambient conditions. The results are set forth in Table 11.

Example 5

The binder formulations set forth in Table 12 were utilized to form R-19 fiberglass insulation batts in a conventional manner known by those of skill in the art. The R-19 fiberglass insulation batts had a target losss on ignition (LOI) of 6%. The mechanical properties of the batts were determined under ambient conditions. The results are set forth in Table 13.

TABLE 10

| Component | Sample 1 90:10 MD-CA w/5% SHP | Sample 2 80:20 MD-CA w/5% SHP | Sample 3 80:20 MD-PA | Sample 4 70:30 MD-CA w/5% SHP |
|---|---|---|---|---|
| Maltodextrin | 76 lbs | 37 lbs | 66 lbs | 32 lbs |
| gamma-aminopropyl-trihydroxy-silane (24.8% solution) | 0.6 lbs | 0.3 lbs | 0.6 lbs | 0.3 lbs |
| Citric Acid | 8.5 lbs | 9 lbs | — | 14 lbs |
| Acrylic Binder (Acumer 9932)[1] | — | — | 36 lbs | — |
| Sodium Hypophosphite | 4.2 lbs | 2.3 lbs | — | 2.3 lbs |
| Oil Emulsion (50%) | 31.5 lbs | 17 lbs | 31 lbs | 17 lbs |
| Water | 1080.2 lbs | 583.4 lbs | 1040.4 lbs | 586.4 lbs |
| Total | 1201 lbs | 649 lbs | 1174 lbs | 652 lbs |

[1]Acumer 9932: a polyacrylic acid resin (46% solids) commercially available from The Dow Chemical Company.

**MD = maltodextrin, CA = citric acid, PA = polyacrylic acid, SHP = sodium hypophosphite

TABLE 11

| | Sample 1 | Sample 2 | Sample 3 | Sample 4 | Phenol/Urea/Formaldehyde (Control) |
|---|---|---|---|---|---|
| Thickness Recovery (in) | 6.4 | 6.3 | 6.3 | 6.2 | 6.2 |
| Stiffness/Sag (degree) | 23 | 19 | 35 | 15 | 18 |

From the data presented in Tables 10 and 11, it was concluded that binder formulations containing maltodextrin with polyacrylic acid or different ratios of maltodextrin and citric acid could be cured under typical manufacturing conditions and achieved product performance comparable to that of current commercially available products.

TABLE 12

| Component | Sample 1 70:20:10 MD-CA-G w/5% SHP | Sample 2 60:20:20 MD-CA-G w/5% SHP | Sample 3 60:30:10 MD-CA-G w/5% SHP | Sample 4 50:30:20 MD-CA-G w/5% SHP |
|---|---|---|---|---|
| Maltodextrin (50% Solids) | 65.8 lbs | 56.4 lbs | 56.4 lbs | 47.0 lbs |
| Citric Acid (50% Solids) | 18.8 lbs | 18.8 lbs | 28.2 lbs | 28.2 lbs |
| Sodium Hypophosphite (41.5% Solids) | 5.66 lbs | 5.66 lbs | 5.66 lbs | 5.66 lbs |
| Glycerol | 4.70 lbs | 9.40 lbs | 4.70 lbs | 9.40 lbs |
| Oil Emulsion (50% Solids) | 4.24 lbs | 4.24 lbs | 4.24 lbs | 4.24 lbs |
| gamma-aminopropyl-trihydroxy-silane (24.8% solution) | 0.37 lbs | 0.37 lbs | 0.37 lbs | 0.37 lbs |
| Water | 545.6 lbs | 550.3 lbs | 545.6 lbs | 550.3 lbs |

** MD = maltodextrin, G = glycerol, CA = citric acid, SHP = sodium hypophosphite

TABLE 13

|  | 80:20 MDCA w/5% SHP | Sample 1 70:10:20 MD-G-CA w/5% SHP | Sample 2 60:20:20 MD-G-CA w/5% SHP | Sample 3 60:10:30 MD-G-CA w/5% SHP | Sample 4 50:20:30 MD-G-CA w/5% SHP |
|---|---|---|---|---|---|
| Thickness Recovery (in) | 5.86 | 6.05 | 5.82 | 5.56 | 5.55 |
| Stiffness/Sag (degree) | 40 | 43 | 43 | 33 | 34 |

** MD = maltodextrin, CA = citric acid, G = glycerol, SHP = sodium hypophosphite It was concluded from the data set forth in Tables 12 and 13 that binder formulations containing process aid agents (e.g., glycerin) at varying levels achieved product performance comparable to that of current commercially available products. It was also observed that the uncured blanket ramp height before entering the oven was improved proportional to the percent of glycerin present in the binder composition. For example, the ramp height increased from 15% to 50% as the percent of glycerin present in the composition was raised from 5% to 15%.

Example 6

The binder formulations set forth in Tables 14 and 16 were utilized to form handsheets according to the procedure set forth in Example 1. The nonwoven fiberglass handsheets were dried and cured for three minutes at 400° F. The tensile strength, the LOI, and the tensile strength/LOI for each sample was determined under ambient and steam conditions. The steam conditions were identical to that set forth in Example 1. In addition, the loss on ignition and tensile strength of each the samples were measured according to the procedures described in Example 1. The results are set forth in Tables 15 and 17. It is to be noted that the weights in Tables 15 and 17 are expressed in grams (g).

TABLE 14

| Component | Sample 1 80:20 MD-CA w/5% SHP | Sample 2 70:20:10 MD-CA-TEOA w/5% SHP | Sample 3 75:20:5 MD-CA-TEOA w/5% SHP | Sample 4 70:20:10 MD-CA-DEOA w/5% SHP |
|---|---|---|---|---|
| Maltodextrin (50% Solids) | 116.14 | 101.62 | 108.88 | 101.62 |
| Citric Acid (100% Solids) | 14.52 | 14.52 | 14.52 | 14.52 |
| Sodium Hypophosphite (41.5% Solids) | 8.75 | 8.75 | 8.75 | 8.75 |
| Triethanolamine (100% Solids) |  | 7.26 | 3.63 |  |
| Diethanolamine (100% Solids) |  |  |  | 7.26 |
| gamma-aminopropyl-trihydroxy-silane (1.24% solution) | 11.47 | 11.47 | 11.47 | 11.47 |
| Water | 749.13 | 756.39 | 752.76 | 756.39 |
| Total (g) | 900 | 900 | 900 | 900 |

** MD = maltodextrin, CA = citric acid, TEOA = Triethanolamine, DEOA = Diethanolamine, SHP = sodium hypophosphite

TABLE 15

|  | Sample 1 | Sample 2 | Sample 3 | Sample 4 |
|---|---|---|---|---|
| Tensile Strength (lbf) | 15.7 | 16.5 | 15.9 | 14.6 |
| LOI (%) | 5.74 | 5.52 | 5.27 | 4.79 |
| Tensile/LOI | 2.74 | 3.00 | 3.03 | 3.06 |

TABLE 16

| Component | Sample 6 70:30 MD-CA w/5% SHP | Sample 7 60:30:10 MD-CA-TEOA w/5% SHP | Sample 8 65:30:5 MD-CA-TEOA w/5% SHP | Sample 9 60:30:10 MD-CA-TEOA | Sample 10 65:30:5 MD-CA-TEOA |
|---|---|---|---|---|---|
| Maltodextrin (50% Solids) | 101.62 | 87.10 | 94.36 | 91.46 | 99.08 |
| Citric Acid (100% Solids) | 21.78 | 21.78 | 21.78 | 22.86 | 22.86 |
| Sodium Hypophosphite (41.5% Solids) | 8.75 | 8.75 | 8.75 | | |
| Triethanolamine (100% Solids) | | 7.26 | 3.63 | 7.62 | 3.81 |
| Diethanolamine (100% Solids) | | | | | |
| gamma-aminopropyl-trihydroxy-silane (1.24% solution) | 11.47 | 11.47 | 11.47 | 11.47 | 11.47 |
| Water | 756.39 | 763.64 | 760.01 | 766.58 | 762.77 |
| Total (g) | 900 | 900 | 900 | 900 | 900 |

** MD = maltodextrin, CA = citric acid, TEOA = Triethanolamine, DEOA = Diethanolamine, SHP = sodium hypophosphite

TABLE 17

|  | Sample 6 | Sample 7 | Sample 8 | Sample 9 | Sample 10 |
|---|---|---|---|---|---|
| Tensile Strength (lbf) | 15.5 | 19.1 | 18.9 | 16.3 | 18.2 |
| LOI (%) | 5.20 | 5.11 | 4.95 | 6.00 | 6.55 |
| Tensile/LOI | 2.99 | 3.74 | 3.83 | 3.27 | 2.78 |

From the data set forth in Tables 14-17, it was concluded that binder formulations containing alkanol amine added as a crosslinking enhancer achieved tensile strengths and LOIs comparable to or better than that of current commercially available products.

Example 7

The binder formulations set forth in Table 18 and Table 20 were utilized to form R-21 fiberglass insulation batts in a conventional manner known by those of skill in the art. The R-21 fiberglass insulation batts had a target loss on ignition (LOI) of 5.5%. The mechanical properties of the batts at the end of the line were determined under ambient conditions.

The results are set forth in Tables 19 and 20.

TABLE 18

| Component | Sample 1 80:20 MD-CA w/5% SHP | Sample 2 70:30 MD-CA w/5% SHP | Sample 3 60:40 MD-CA w/5% SHP | Sample 4 60:30:10 MD-CA-G w/5% SHP | Sample 5 60:30:5:5 MD-CA-G-TEOA w/5% SHP |
|---|---|---|---|---|---|
| Maltodextrin (68% Solids) | 258.7 lbs | 226.4 lbs | 194.0 lbs | 194.0 lbs | 194.0 lbs |
| Citric Acid (50% Solids) | 88.0 lbs | 131.9 lbs | 175.9 lbs | 131.9 lbs | 131.9 lbs |
| Sodium Hypophosphite (41.5% Solids) | 26.5 lbs | 26.5 lbs | 26.5 lbs | 26.5 lbs | 26.5 lbs |
| Glycerol (100% Solids) | | | | 22.0 lbs | 11.0 lbs |

TABLE 18-continued

| Component | Sample 1 80:20 MD-CA w/5% SHP | Sample 2 70:30 MD-CA w/5% SHP | Sample 3 60:40 MD-CA w/5% SHP | Sample 4 60:30:10 MD-CA-G w/5% SHP | Sample 5 60:30:5:5 MD-CA-G-TEOA w/5% SHP |
|---|---|---|---|---|---|
| Triethanolamine (100% Solids) | | | | | 11.0 lbs |
| Diethanolamine (85% Solids) | | | | | |
| Oil Emulsion (50% Solids) | 68.4 lbs | 68.4 lbs | 68.4 lbs | 68.4 lbs | 68.4 lbs |
| gamma-aminopropyl-trihydroxy-silane (1.24% solution) | 34.6 lbs | 34.6 lbs | 34.6 lbs | 34.6 lbs | 34.6 lbs |
| Water | 2228.5 lbs | 2218.9 lbs | 2209.3 lbs | 2227.4 lbs | 2227.4 lbs |

\** MD = maltodextrin, CA = citric acid, G = glycerol, TEOA = Triethanolamine, DEOA = Diethanolamine, SHP = sodium hypophosphite

TABLE 19

| | Sample 1 | Sample 2 | Sample 3 | Sample 4 | Sample 5 |
|---|---|---|---|---|---|
| Stiffness/Sag (degree) | 13.60 | 9.63 | 9.65 | 10.68 | 11.23 |

TABLE 20

| Component | Sample 6 60:30:10 MD-CA-TEOA w/5% SHP | Sample 7 60:30:10 MD-CA-TEOA | Sample 8 60:30:10 MD-CA-DEOA w/5% SHP | Sample 9 65:30:5 MD-CA-DEOA w/5% SHP | Sample 10 67:33 MD-CA |
|---|---|---|---|---|---|
| Maltodextrin (68% Solids) | 194.0 lbs | 203.7 lbs | 194.0 lbs | 210.2 lbs | 226.4 lbs |
| Citric Acid (50% Solids) | 131.9 lbs | 138.5 lbs | 131.9 lbs | 131.9 lbs | 153.9 lbs |
| Sodium Hypophosphite (41.5% Solids) | 26.5 lbs | | 26.5 lbs | 26.5 lbs | |
| Glycerol (100% Solids) | | | | | |
| Triethanolamine (100% Solids) | 22.0 lbs | 23.1 lbs | | | |
| Diethanolamine (85% Solids) | | | 25.9 lbs | 12.9 lbs | |
| Oil Emulsion (50% Solids) | 68.4 lbs | 68.4 lbs | 68.4 lbs | 68.4 lbs | 68.4 lbs |
| gamma-aminopropyl-trihydroxy-silane (1.24% solution) | 34.6 lbs | 34.6 lbs | 34.6 lbs | 34.6 lbs | 34.6 lbs |
| Water | 2227.4 lbs | 2234.9 lbs | 2224.2 lbs | 2221.6 lbs | 2224.9 lbs |

\** MD = maltodextrin, CA = citric acid, G = glycerol, TEOA = Triethanolamine, DEOA = Diethanolamine, SHP = sodium hypophosphite

TABLE 21

| | Sample 6 | Sample 7 | Sample 8 | Sample 9 | Sample 10 |
|---|---|---|---|---|---|
| Stiffness/Sag (degree) | 11.85 | 12.28 | 9.82 | 9.85 | 12.11 |

As shown in Tables 18-21, the addition of glycerol, diethanolamine, and/or triethanolamine to the bio-based binder yielded fiberglass insulation products having good performance properties, such as acceptable stiffness/sag. In addition, binder formulations containing a blend of maltodextrin and citric acid without the presence of a catalyst cured under typical manufacturing conditions and produced acceptable stiffness/sag performance.

Example 8

The binder formulations set forth in Table 22 were utilized to form fiberglass 5 pcf, 1 inch thick ceiling boards in a conventional manner known by those of skill in the art. The ceiling boards had a target loss on ignition (LOI) of 13%. The mechanical properties of the ceiling boards were determined under ambient conditions. The results are set forth in Table 23. Comparative Samples 1-3 are presented in Table 22 and Sample 4, the Control in this experiment, although not specifically identified in Table 22, is an Owens Corning 5 pound-per-cubic-foot (pcf) 1 inch thick ceiling board, a commercially available product.

TABLE 22

Bio-Based Binder Formulation for 5 pound-per-cubic-foot (pcf), 1 inch thick ceiling boards

| Component | Sample 1 70:30 MD-CA w/5% SHP | Sample 2 50:35:15 MD-CA-G w/5% SHP | Sample 3 60:30:10 MD-CA-TEOA w/5% SHP |
|---|---|---|---|
| Maltodextrin (50% Solids) | 709.1 lbs | 506.5 lbs | 607.8 lbs |
| Citric Acid (50% Solids) | 303.9 lbs | 354.5 lbs | 303.9 lbs |
| Sodium Hypophosphite (41.5% Solids) | 61.0 lbs | 61.0 lbs | 61.0 lbs |
| Glycerol (100% Solids) | | 76.0 lbs | |
| Triethanolamine (100% Solids) | | | 50.6 lbs |
| Surfynol 465 (100% Solids) | 1.1 lbs | 1.1 lbs | 1.1 lbs |
| Oil Emulsion (50% Solids) | 56.4 lbs | 56.4 lbs | 56.4 lbs |
| gamma-aminopropyl-trihydroxy-silane (24.8% solution) | 4.0 lbs | 4.0 lbs | 4.0 lbs |
| Water | 1384.3 lbs | 1447.1 lbs | 1426.2 lbs |

** MD = maltodextrin, CA = citric acid, G = glycerol, TEOA = Triethanolamine, SHP = sodium hypophosphite

TABLE 23

Product Performance for 5 pcf, 1 inch thick ceiling boards

| | Sample 1 70:30 MD-CA w/5% SHP | Sample 2 50:35:15 MD-CA-G w/5% SHP | Sample 3 60:30:10 MD-CA-TEOA w/5% SHP | Sample 4 Phenol/Urea/Formaldehyde (Control)[1] |
|---|---|---|---|---|
| Flex Modulus (ksi) | 1931 | 2080 | 2000 | 1946 |
| Compressive Load @ 10% Deformation (lbs) | 37.1 | 32.5 | 37.1 | 31.1 |

[1] Owens Corning 5 pound-per-cubic-foot (pcf) 1 inch thick ceiling board, a commercially available product.

As shown in Tables 22 and 23, the bio-based binder produced ceiling boards having good performance properties, such as improved (or equivalent) flexural modulus and improved compressive load deformation.

Example 9

The binder formulations set forth in Table 24 were utilized to form R-6 fiberglass flexible duct media (FDM) in a conventional manner known by those of skill in the art. The flexible duct media had a target LOI of 6%. The mechanical properties of the flexible duct media were determined under ambient conditions. The results are set forth in Table 25.

TABLE 24

Bio-Based Binder Formulation for Flexible Duct Media

| Component | Sample 1 70:30 MD-CA w/5% SHP |
|---|---|
| Maltodextrin (50% Solids) | 529.9 lbs |
| Citric Acid (50% Solids) | 227.1 lbs |
| Sodium Hypophosphite (41.5% Solids) | 45.6 lbs |
| Red Dye (35% Solids) | 9.2 lbs |
| Oil Emulsion (50% Solids) | 106.9 lbs |
| gamma-aminopropyl-trihydroxy-silane (24.8% solution) | 59.6 lbs |
| Water | 3567.2 lbs |

** MD = maltodextrin, CA = citric acid, SHP = sodium hypophosphite

TABLE 25

Product Performance for R-6 Flexible Duct Media Insulation

| | Sample 1 70:30 MD-CA w/5 % SHP | Owens Corning R-6 Phenol/Urea/Formaldehyde Flexible Duct Media Insulation (Control) |
|---|---|---|
| Tensile Strength (lbf) | 17 | 20 |

As shown in Tables 24 and 25, the bio-based produced R-6 flexible duct media insulation that possessed a tensile strength comparable to that of an existing R-6 flexible duct media insulation commercial product.

Example 10

The binder formulations set forth in Table 26 were utilized to form R-13 fiberglass metal building insulation (MBI) in a conventional manner known by those of skill in the art. The ceiling boards had a target LOI of 6.5%. The mechanical properties of the metal building insulation were determined under ambient conditions. The results are set forth in Table 27.

TABLE 26

Bio-Based Binder Formulation for Metal Building Insulation

| Component | Sample 1<br>70:30 MD-CA<br>w/5% SHP |
|---|---|
| Maltodextrin (50% Solids) | 463.9 lbs |
| Citric Acid (50% Solids) | 198.8 lbs |
| Sodium Hypophosphite (41.5% Solids) | 39.9 lbs |
| Red Dye (35% Solids) | 7.3 lbs |
| Oil Emulsion (50% Solids) | 84.9 lbs |
| gamma-aminopropyl-trihydroxy-silane (24.8% solution) | 52.2 lbs |
| Water | 1806 lbs |

** MD = maltodextrin, CA = citric acid, SHP = sodium hypophosphite

TABLE 27

Product Performance for R-13 Metal Building Insulation

| | Sample 1<br>70:30 MD-CA<br>w/5% SHP | Owens Corning R-13<br>Phenol/Urea/<br>Formaldehyde Metal<br>Building Insulation<br>(Control) |
|---|---|---|
| Thickness (in) | 4.64 | 4.66 |

As shown in Tables 26 and 27, the bio-based binder produced R-13 metal building insulation that had a thickness comparable to that of a commercially available R-13 metal building insulation product.

Example 11

Surface tensions of the bio-based binders containing surfactants to lower the binder surface tension, to improve binder spray atomization, to improve binder distribution uniformity, and to improve binder wetting and moving of the binder to fiber-fiber junctions were compared with a phenol/urea/formaldehyde binder standard. Surface tensions of the inventive bio-based binder compositions were measured using a Surface Tensionmeter 6000 (manufactured by the SensaDyne Instrument Division of the Chem-Dyne Research Group). The instrument was calibrated with deionized water. Data was recorded every 5 seconds. After the system was stabilized and the testing had begun, the average value over a one-minute testing period was obtained for each sample. The results are set forth in Table 28.

TABLE 28

Surface tension of the bio-based binder and surfactant addition

| Binder Mixture<br>(10% total solids) | Surfactant | % on binder solids | Surface Tension (dyne/cm) |
|---|---|---|---|
| phenol/urea/formaldehyde (Control) | None | None | 72.0 |
| 80:20 MD-CA w/5% SHP | None | None | 77.7 |
| 80:20 MD-CA w/5% SHP | Stanfax[1] | 0.1 | 46.0 |
| | | 0.3 | 41.3 |
| | | 0.5 | 41.9 |
| 80:20 MD-CA w/5% SHP | Surfynol 465[2] | 0.1 | 51.0 |
| | | 0.3 | 49.4 |
| | | 0.5 | 46.2 |
| 80:20 MD-CA w/5% SHP | Triton™ GR-PG70[3] | 0.1 | 35.6 |
| | | 0.3 | 31.3 |
| | | 0.5 | 30.1 |
| 80:20 MD-CA w/5% SHP | Sodium Dodecyl-Sulfate | 0.1 | 60 |
| | | 0.3 | 51.9 |
| | | 0.5 | 50.8 |
| 80:20 MD-CA w/5% SHP | Triton™ CF-10 | 0.1 | 39.1 |
| | | 0.3 | 39.3 |
| | | 0.5 | 40 |

[1]Stanfax—sodium lauryl sulfate
[2]Surfynol 465—ethoxylated 2,4,7,9-tetramethyl 5 decyn-4,7-diol
[3]Triton™ GR-PG70—1,4-bis(2-ethylhexyl) sodium sulfosuccinate
[4]Triton™ CF-10—poly(oxy-1,2-ethanediyl), alpha-(phenylmethyl)-omega-(1,1,3,3-tetramethylbutyl)phenoxy
** MD = maltodextrin, CA = citric acid, SHP = sodium hypophosphite It was concluded from observing the results set forth in Table 28 that the surface tension of the bio-based binder was reduced by adding surfactants.

TABLE 29

Coupling agents for the bio-based binder formulations - Fiberglass Handsheets

| Component | Sample 1<br>70:30<br>MD-CA<br>w/5%<br>SHP | Sample 2<br>70:30<br>MD-CA<br>w/5% SHP<br>and 0.19%<br>Tyzor®<br>TE | Sample 3<br>70:30<br>MD-CA<br>w/5% SHP<br>and 0.38%<br>Tyzor®<br>TE | Sample 4<br>70:30<br>MD-CA<br>w/5% SHP<br>and 0.19%<br>Tyzor®<br>AA-75 | Sample 5<br>70:30<br>MD-CA<br>w/5% SHP<br>and 0.38%<br>Tyzor®<br>AA-75 | Sample 6<br>70:30<br>MD-CA<br>w/5% SHP<br>and 0.19%<br>Tyzor®<br>TPT |
|---|---|---|---|---|---|---|
| Maltodextrin (50% conc.) (DE 11.0) | 90.3 g | 90.3 g | 90.0 g | 90.3 g | 90.0 g | 90.3 g |
| Citric Acid | 19.4 g | 19.4 g | 19.3 g | 19.4 g | 19.3 g | 19.4 g |
| gamma-aminopropyl-trihydroxy-silane (1.24% solution) | 10.2 g | | | | | |
| Sodium Hypophosphite (41.5% conc.) | 3.9 g | 3.9 g | 3.9 g | 3.9 g | 3.9 g | 3.9 g |
| Tyzor® TE (80% Conc.) | | 0.16 g | 0.32 g | | | |
| Tyzor® AA-75 (75% Conc.) | | | | 0.17 g | 0.34 g | |

TABLE 29-continued

Coupling agents for the bio-based binder formulations - Fiberglass Handsheets

| Component | Sample 1 70:30 MD-CA w/5% SHP | Sample 2 70:30 MD-CA w/5% SHP and 0.19% Tyzor ® TE | Sample 3 70:30 MD-CA w/5% SHP and 0.38% Tyzor ® TE | Sample 4 70:30 MD-CA w/5% SHP and 0.19% Tyzor ® AA-75 | Sample 5 70:30 MD-CA w/5% SHP and 0.38% Tyzor ® AA-75 | Sample 6 70:30 MD-CA w/5% SHP and 0.19% Tyzor ® TPT |
|---|---|---|---|---|---|---|
| Tyzor ® TPT (100% Conc.) | | | | | | 0.13 g |
| Water | 676.2 | 686.3 | 686.5 | 686.3 | 686.5 | 686.3 |
| Total | 800 g | 800 g | 800 g | 800 g | 800 g | 800 g |

**MD = maltodextrin, CA = citric acid, SHP = sodium hypophosphite

TABLE 30

Mechanical properties for handsheets with the bio-based binder formulations containing different coupling agents

| | Sample 1 70:30 MD-CA w/5% SHP | Sample 2 70:30 MD-CA w/5% SHP and 0.19% Tyzor ® TE | Sample 3 70:30 MD-CA w/5% SHP and 0.38% Tyzor ® TE | Sample 4 70:30 MD-CA w/5% SHP and 0.19% Tyzor ® AA-75 | Sample 5 70:30 MD-CA w/5% SHP and 0.38% Tyzor ® AA-75 | Sample 6 70:30 MD-CA w/5% SHP and 0.19% Tyzor ® TPT |
|---|---|---|---|---|---|---|
| Tensile Strength (lbf) | 16.13 | 16.43 | 15.79 | 15.2 | 15.05 | 20.17 |
| LOI (%) | 5.85 | 6.27 | 6.34 | 6.33 | 6.17 | 6.73 |
| Tensile/LOI | 2.76 | 2.62 | 2.49 | 2.4 | 2.44 | 3.00 |
| After Steam aging Tensile Strength (lbf) | 10.66 | 6.51 | 6.64 | 7.30 | 10.25 | 10.29 |
| After Steam aging LOI (%) | 5.03 | 6.06 | 6.36 | 6.58 | 6.46 | 8.44 |
| After Steam aging Tensile/LOI | 2.12 | 1.08 | 1.04 | 1.11 | 1.59 | 1.22 |

**MD = maltodextrin, CA = citric acid, SHP = sodium hypophosphite

From the data set forth in Tables 29 and 30, it was concluded that the bio-based formulations containing different coupling agents achieved tensile strengths comparable to that of current commercially available products.

Example 12

The bio-based binder may emit an aroma depending upon product and curing conditions. To minimize the emission of undesired aromas, various alkanol amines were added to the binder composition and R-20 products were produced under typical (conventional) manufacturing conditions. The produced materials were cut into 8×8 (inch$^2$), placed in zip bags, and sealed. Ten panelists were provided with a fresh sample bag and the panelists individually ranked each of the samples from strongest aroma (higher number) to weakest aroma (lower number). The results are presented in Table 31.

TABLE 31

Aroma decrease in insulation made with the bio-based binder

| Sample | Description | Aroma Ranking (intensity descending order) |
|---|---|---|
| Sample 1 | 70:30 MD-CA w/5% SHP | 4 |
| Sample 2 | 60:30:10 MD-CA-TEOA | 3 |
| Sample 3 | 65:30:5 MD-CA-TEOA w/5% SHP | 2 |
| Sample 4 | 65:30:5 MD-CA-DEOA w/5% SHP | 1 |

** MD = maltodextrin, CA = citric acid, TEOA = Triethanolamine, DEOA = diethanolamine, SHP = sodium hypophosphite Based upon the data set forth in Table 31, it was concluded that the aroma generated by the cured insulation product was reduced using an inventive bio-based binder containing an alkanol amine.

Example 13

The binder formulations of Sample 1 and Sample 2 set forth in Table 18 combined with the moisture resistant additives listed in Table 32 were utilized to form fiberglass R-13 insulation products in a conventional manner known by those of skill in the art. The R-13 products had a target LOI of 6.5%. The mechanical properties of the moisture resistance additive added bio-binder were determined under ambient conditions. The results are set forth in Table 32.

TABLE 32

Additives added to improve water resistance of fiberglass insulation made with bio-based binder-R-13 batts

| Description | Additive added | Amount added (% on Binder Solids) | Stiffness/ Sag (degree) |
|---|---|---|---|
| 80:20 MD-CA w/5% SHP | | | 39 |
| 70:30 MD-CA w/5% SHP | | | 28 |
| 70:30 MD-CA w/5% SHP | Polon MF56 | 0.3 | 32 |
| 70:30 MD-CA w/5% SHP | SVE-148 | 0.3 | 30 |
| 70:30 MD-CA w/5% SHP | LE-743 | 0.3 | 31 |
| 70:30 MD-CA w/5% SHP | Silres BS-1042 | 0.3 | 37 |
| 70:30 MD-CA w/5% SHP | ICM-2153 | 0.3 | 35 |
| 70:30 MD-CA w/5% SHP | Silquest Y-9669 | 0.3 | 40 |

** MD = maltodextrin, CA = citric acid, SHP = sodium hypophosphite

Based upon the data set forth in Table 32, it was concluded that the bio-based binder formulations containing different moisture resistant additives obtained a fiber glass insulation product with performance capabilities comparable to that of commercially available fiber glass insulation products.

Example 14

An environmental emission test was using the basic formulation set forth as Sample 1 of Table 18 together with either alone or with an existing emulsified mineral dedusting oil. The test was conducted over a period of at least 5 hours using a conventional production line to make an R-19 insulation product for each formulation including a control. A typical emission sampling analytical procedure was followed and the filtered particulate emission and formaldehyde emission were listed in the Table 33.

TABLE 33

Forming Emission Test Results

| Compound/ Sample Train | Binder Type MDCA lbs/hour | Binder Type MDCA-Veg. Oil lbs/hour | Binder Type Phenol/Urea/ Formaldehyde (Control) lbs/hour |
|---|---|---|---|
| Filtered Particulate, M5/202 | 5.499 | 5.064 | 6.737 |
| Formaldehyde M316 | 0.028 | 0.023 | 0.414 |

From the data set forth in Table 33, it was concluded that the bio-based binder, when applied in a conventional fiber glass insulation manufacturing process, reduced forming particulate emission by 18% or more and nearly eliminated formaldehyde emission during the formation of the insulation. It is noted that the small amount of formaldehyde detected might have been derived from formaldehyde binder residue or some other contamination.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

What is claimed is:

1. A soy-containing binder composition for use in the formation of fibrous insulation products, the soy-containing binder composition comprising:
   a monosaccharide,
   a crosslinking agent comprising a polyamine,
   a catalyst comprising a Lewis acid,
   an acidic pH adjuster, and
   a soy protein,
   wherein the soy-containing binder composition is formaldehyde-free;
   wherein the monosaccharide comprises 60 wt. % to 90 wt. % of the binder composition; and
   wherein the pH of the soy-containing binder composition is from 2 to 5.

2. The soy-containing binder composition of claim 1, wherein the soy protein comprises soy flour.

3. The soy-containing binder composition of claim 1, wherein the soy protein comprises an amount up to and including 70 wt. % of the binder composition.

4. The soy-containing binder composition of claim 1, wherein the soy protein comprises 5 wt. % to 50 wt. % of the binder composition.

5. The soy-containing binder composition of claim 1, wherein the soy protein comprises 10 wt. % to 40 wt. % of the binder composition.

6. The soy-containing binder composition of claim 1, wherein the monosaccharide is selected from the group consisting of xylose, glucose, and fructose.

7. The soy-containing binder composition of claim 1, wherein the monosaccharide comprises 70 wt. % to 85 wt. % of the binder composition.

8. The soy-containing binder composition of claim 1, wherein the catalyst comprises 1 wt. % to 5 wt. % of the binder composition.

9. A fibrous insulation product comprising the soy-containing binder composition of claim 1.

10. The fibrous insulation product of claim 9, wherein the fibrous insulation product further comprises glass fibers.

* * * * *